(12) United States Patent
Yanagisawa et al.

(10) Patent No.: US 7,073,912 B2
(45) Date of Patent: Jul. 11, 2006

(54) OPTICAL PARTS CASING AND PROJECTOR

(75) Inventors: Yoshiyuki Yanagisawa, Matsumoto (JP); Hiroshi Abe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 10/771,428

(22) Filed: Feb. 5, 2004

(65) Prior Publication Data

US 2004/0223237 A1 Nov. 11, 2004

(30) Foreign Application Priority Data

Feb. 13, 2003 (JP) ............................ 2003-035578
Aug. 26, 2003 (JP) ............................ 2003-301300

(51) Int. Cl.
*G03B 21/16* (2006.01)

(52) U.S. Cl. ........................... 353/61; 353/119; 353/52

(58) Field of Classification Search ................ 353/119, 353/52, 57–61; 348/794, 787; 349/72, 58
See application file for complete search history.

(56) References Cited

U.S. PATENT DOCUMENTS 6,280,038 B1 * 8/2001 Fuse et al. .................... 353/57
6,623,125 B1 * 9/2003 Chen et al. .................... 353/52
2001/0043312 A1 * 11/2001 Fuse et al. .................... 353/57
2002/0163627 A1 * 11/2002 Ohishi et al. ................. 353/58

FOREIGN PATENT DOCUMENTS

| JP | A-8-304739 | 11/1996 |
| JP | A 2000-19645 | 1/2000 |
| JP | A-2000-19646 | 1/2000 |
| JP | A-2002-90875 | 3/2002 |
| JP | A-2002-189251 | 7/2002 |

* cited by examiner

*Primary Examiner*—W. B. Perkey
*Assistant Examiner*—Andrew Sever
(74) *Attorney, Agent, or Firm*—Oliff & Berridge, PLC.

(57) ABSTRACT

Heat of optical devices is transferred to a bottom surface portion 512B of an optical parts housing portion 512 of an optical parts casing 5A. A duct 6 is formed on the bottom surface portion 512B. A cooling air passing through a first passage 6A cools the bottom surface portion 512B, and then is supplied to a hole 515R to cool a liquid crystal panel 441R, etc. The cooling air passing through a second passage 6B of the duct 6 is introduced into holes 515B, 515G to cool the liquid crystal panels 441B, 441G. Accordingly, the optical parts casing projector capable of cooling sufficiently the optical modulator devices and other parts, e.g., the bottom surface portion, etc. of the optical parts casing.

24 Claims, 21 Drawing Sheets

OPTICAL PARTS CASING AND PROJECTOR

BACKGROUND OF THE INVENTION

1. Field of Invention

The present invention relates to an optical parts casing and a projector, and is also related to a projector that is widely utilized in a multimedia presentation in a conference, an academic conference, an exhibition, and so on.

2. Description of Related Art

The related art discloses a projector that emits a luminous flux from a light source to uniformize an intensity in an irradiated plane by an illumination optical system, then separates the luminous flux into three color lights of a red light, a green light, and a blue light by a color separation optical system, then modulates the color lights by an optical modulator device for every color light, then synthesizes the color lights by a color synthesis optical system, and then enlarges and projects a color image from a projection optical system.

The optical systems of such a related art projector have a plurality of optical parts respectively. For example, the illumination optical system has an integrator lens to divide the luminous flux emitted from the light source into a plurality of partial luminous fluxes and a condenser lens to converge the partial luminous fluxes. Also, the color synthesis optical system has a cross dichroic prism (color synthesis optical device).

These plural optical parts are housed in an optical parts casing referred to as a light guide which is made of metal, as shown in JP-A-2000-19645 (see FIG. 4), for example. Such a casing is constructed so that heat generated from respective optical parts is transferred to a bottom surface portion (outer surface portion) of the optical parts casing.

A method of cooling the bottom surface portion of the optical parts casing includes a method of introducing cooling air into an inside of the optical parts casing from the upper surface portion side of the optical parts casing to cool the optical modulator device, etc. and then feed this cooling air to a bottom surface portion to cool it.

Also, the related art includes a method of introducing the cooling air into the bottom surface portion side of the optical parts casing, and then introducing a part of the cooling air into an inside of the casing to cool the optical modulator device, etc., and also a part of the remaining air along the bottom surface portion to cool the bottom surface portion.

SUMMARY OF THE INVENTION

However, according to the former method, the bottom surface portion of the casing is cooled by warm air obtained after such air cooled the optical modulator device, etc. Therefore, there exists a problem that the warm air fails to sufficiently cool the bottom surface portion and thus a cooling efficiency is low.

Also, according to the latter method, the optical modulator device, etc., are cooled by a part of the air that is introduced into the bottom surface portion side of the optical parts casing, and the bottom surface portion is cooled by a part of the remaining air. Therefore, there exists a problem that a quantity of the air used to cool respective portions is reduced. Thus, the air fails to sufficiently cool both the bottom surface portion and the optical modulator device.

An exemplary aspect of the present invention provides an optical parts casing and a projector capable of sufficiently cooling an optical modulator device and other parts, e.g., a bottom surface portion, etc. of an optical parts casing.

A first optical parts casing of an exemplary aspect of the present invention houses optical parts including a plurality of optical modulator devices that modulate a plurality of color lights in response to image information every color light, and arranges the optical parts at predetermined positions on an illumination optical-axis of a luminous flux emitted from a light source.

The first optical parts casing of an exemplary aspect of the present invention includes a thermal-conductive outer surface portion that the optical parts contact; and ribs provided upright on the outer surface portion to constitute ducts that guide a cooling fluid to cool the plurality of optical modulator devices, and holes formed in the outer surface portion to guide the cooling fluid from the ducts to the optical modulator devices in the optical parts casing, the ribs including a rib to define a first passage that guides the cooling fluid introduced from cooling-fluid introducing opening ports of the ducts to one optical modulator device that modulates a color light having a small intensity of light out of the plurality of color lights, and a rib to define a second passage that introduces the cooling fluid introduced from the opening ports to other optical modulator devices. The rib to define the first passage and the rib to define the second passage are formed such that the first passage surrounds the second passage along the outer surface portion of the optical parts casing, and the cooling fluid passing through the first passage cools the outer surface portion.

Here, the optical parts may contact directly with the outer surface portion or may contact indirectly with the outer surface portion. Any configuration may be employed if the heat of the optical parts can be transferred to the outer surface portion.

According to an exemplary aspect of the present invention, the following and other advantages, can be achieved.

(1) The cooling fluid passing through the first passage cools the outer surface portion of the optical parts casing that the optical parts contact and to which the heat of the optical parts is transferred, and then enter into the inside of the optical parts casing from the holes formed in the outer surface portion to cool the optical modulator devices. In the exemplary aspect of the present invention, since the outer surface portion is cooled directly by the cooling fluid passing through the first passage, such an outer surface portion can be cooled effectively. As a result, the heat of the optical parts is readily transferred to the outer surface portion and thus radiation efficiencies of the optical parts can be enhanced.

(2) Also, normally the optical modulator devices absorb a part of modulated light, thus generating heat. In this case, since the optical modulator device cooled by the cooling fluid passing through the first passage modulates the color light having a small intensity of light, its calorific value becomes small in contrast to the optical modulator devices that modulate other color lights. Therefore, sufficient cooling can be executed by the cooling fluid obtained after such fluid cooled the outer surface portion.

Now, for example, when the super-high pressure mercury lamp or a part of metal halide lamps is used as the light source of a plurality of color lights, the red light is given as the color light having a small intensity of light. Also, when the halogen lamp or a part of other metal halide lamps is used as the light source, the blue light is given as the color light having a small intensity of light. In this case, an intensity of light in this application signifies an energy that is derived by an integrated value for every wavelength range of each color light of the light emitted from the light source. Therefore, the optical modulator device, which is cooled by the cooling fluid in the first passage after such fluid cooled the outer surface portion of the optical parts casing, corresponds to the optical modulator device on which the color light having a small energy in wavelength ranges of respective color lights is incident, i.e., the optical modulator device to which a small calorific value is given by the incident light.

(3) The cooling fluid passing through the second passage does not cool the outer surface portion of the optical parts casing but instead enters into the inside of the casing from the holes formed in the outer surface portion to cool the other optical modulator devices. In this manner, since the cooling fluid passing through the second passage cools the other optical modulator devices as the cooling fluid at a lower temperature without the heat exchange with the outer surface portion, the other optical modulator devices can be cooled effectively.

(4) The duct is formed in the outer surface portion of the optical parts casing. Therefore, reduction in the number of parts can be attained in contrast to the case that the duct and the optical parts casing are formed as separate bodies.

In the first optical parts casing of an exemplary aspect of the present invention, the other optical modulator devices may have a plurality of modulator devices, the rib to define the second passage may define the second passage that connects in series respective holes to guide the cooling fluid to the plurality of other modulator devices, and the holes connected directly to the opening port may be holes to guide the cooling fluid to the optical modulator device, which modulates a color light having a large intensity of light in the plurality of color lights, out of the plurality of other modulator devices.

According to this, the cooling fluid passing through the second passage is first introduced into the hole corresponding to the optical modulator device, which modulates the color light having a large intensity of light of the plurality of color lights, out of a plurality of other optical modulator devices. The remaining cooling fluid is introduced into the hole corresponding to the optical modulator devices. The optical modulator device to modulate the color light having a large intensity of light has a large calorific value. Thus, no matter how small a quantity of air is fed, sufficient air can be introduced into the hole corresponding to the optical modulator device that modulates the color light having a large intensity of light. Therefore, the optical modulator device that modulates the color light having a large intensity of light can be cooled, and also a cooling efficiency can be enhanced.

In the first optical parts casing of an exemplary aspect of the present invention, the first passage may be formed to have an outer passage to guide the cooling fluid along an outer periphery of the outer surface portion of the optical parts casing, and an inner passage guides the cooling fluid to a space between the outer passage and the second passage.

According to this, the cooling fluid in the first passage can cool the outer surface portion without fail by guiding the cooling fluids to both the outer passage and the inner passage. Therefore, the optical parts that contact the outer surface portion can also be cooled effectively.

A first optical parts casing of an exemplary aspect of the present invention may include a fan to supply the cooling fluid to the ducts.

According to this, a large enough quantity of cooling air can be fed into the above duct by the fan. Thus, the outer surface portion and the optical modulator device, etc. can be cooled. Also, since the configuration of this application can effectively cool the outer surface portion and the optical modulator devices, the number of revolutions of the fan to supply the cooling fluid can be lowered. Also the noise generated by the revolutions of the fan can be reduced. Since the cooling efficiencies of the outer surface portion and the optical modulator device can be enhanced, these parts can be sufficiently cooled even by the fan that has low performance. As a result, reduction of cost of the cooling system can be achieved by employing the fan whose cost is low.

In the first optical parts casing of an exemplary aspect of the present invention, the fan may include a first fan attached to the rib that constitutes the first passage and a second fan attached to the rib that defines the second passage.

According to this, since the fan is connected to the opening ports of the first passage and the second passage respectively, the cooling fluid can be sufficiently fed to respective passages.

A first optical parts casing of an exemplary aspect of the present invention may include a fan to supply the cooling fluid to the ducts. The rib to define the second passage may be formed such that a plurality of second passages are connected to the holes to guide the cooling fluid to the other optical modulator devices formed on the outer surface portion. The cooling-fluid introducing opening ports provided in the first passage and cooling-fluid introducing opening ports provided in at least one of the plurality of second passages may be connected to a same fan.

According to this, because a plurality of second passages are formed, other optical modulator devices can be cooled effectively. For example, in some cases it is difficult for the cooling fluid to enter from the second passage according to the positions of the holes formed in the outer surface portion. Therefore, since the second second passage is formed at a position from which the cooling air can be readily introduced into the hole, the cooling fluid can be introduced into the hole effectively.

Also, when a plurality of second passages are formed, the fan may be connected to the passages respectively. But a number of fans are needed and thus cost is increased. Also, a large space in which a number of fans are installed is required. However, in an exemplary aspect of the present invention, since the opening ports provided in the first passage and the opening ports provided in the second passage are connected to the same fan, an increase in the number of fans can be suppressed. Also, there is no need to assure a large space in which the fans are installed.

In the first optical parts casing of an exemplary aspect of the present invention, a flow regulating plate to regulate a flow of the cooling fluid is arranged in at least one passage of the ducts.

According to this, because the flow regulating plates are provided in the passage, uniformization of the flow rate of the cooling fluid flowing along the outer surface portion of the optical parts casing and/or uniformization of the flow rate on the perpendicular cross section to the flowing direction can be achieved. As a result, the cooling fluid can be passed uniformly and effectively along the outer surface portion of the optical parts casing. Thus cooling efficiencies of the optical parts casing and the optical modulator devices, etc. can be enhanced.

A second optical parts casing of an exemplary aspect of the present invention houses optical parts including a plurality of optical modulator devices that modulate a plurality of color lights in response to image information for every color light, and arrange the optical parts at predetermined positions on an illumination optical-axis of a luminous flux emitted from a light source. A second optical parts casing of an exemplary aspect of the present invention includes a thermal-conductive outer surface portion that the optical parts in the optical parts casing contact and in which holes to guide a cooling fluid to the optical modulator devices are formed; and ducts to guide the cooling fluid to cool the optical modulator devices; the ducts having cooling-fluid introducing opening ports, a rib to define a first passage that guides the cooling fluid introduced from the opening ports to one optical modulator device that modulates a color light having a small intensity of light in the plurality of color lights, and a rib to define a second passage that guides the cooling fluid introduced from the opening ports to other optical modulator devices, the rib to define the first passage being formed to surround the second passage along the outer surface portion of the optical parts casing, and the cooling fluid passing through the first passage cools the outer surface portion of the optical parts casing.

According to such an exemplary aspect of the present invention, in addition to the advantages recited above in (1) to (3), a following advantage can be achieved.

(5) The duct and the optical parts casing are formed as a separate body respectively. Therefore, since the optical parts casing in the present exemplary aspect can be constructed by simply attaching the duct to the outer surface portion of the optical parts casing that exists in the related art, there is no necessity to newly manufacture the optical parts casing. As a result, a reduction of cost can be achieved.

A second optical parts casing of an exemplary aspect of the present invention may include a fan to supply the cooling fluid to the ducts.

According to this, a large enough quantity of cooling air can be fed into the above duct by the fan. Thus, the outer surface portion and the optical modulator device, etc. can be cooled. Also, since the configuration of this application can cool effectively the outer surface portion and the optical modulator devices, the number of revolutions of the fan of the cooling fluid can be lowered. Also the noise generated by the revolution of the fan can be reduced. Since the cooling efficiencies of the outer surface portion and the optical modulator device can be enhanced, these parts can be sufficiently cooled even by the fan that has low performance. As a result, reduction of cost of the cooling system can be achieved by employing a fan whose cost is low.

In the second optical parts casing of an exemplary aspect of the present invention, the rib to define the second passage may be formed such that a plurality of second passages are connected to the holes to guide the cooling fluid to the other optical modulator devices formed on the outer surface portion. Cooling-fluid introducing opening ports provided in the first passage and cooling-fluid introducing opening ports provided in at least one of the plurality of second passages may be connected to the same fan.

According to an exemplary aspect of present invention, because a plurality of second passages are formed, other optical modulator devices can be cooled effectively. For example, in some cases it is difficult for the cooling fluid to enter from the second passage according to the positions of the holes formed in the outer surface portion. Therefore, since the second second passage is formed at the position from which the cooling fluid can be readily introduced into the hole, the cooling fluid can be introduced into the hole effectively.

Also, when a plurality of second passages are formed, the fan may be connected to the passages respectively. But a number of fans are needed and thus a cost is increased. Also, a wide space in which a number of fans are installed is required. In an exemplary aspect of the present invention, since the opening ports provided in the first passage and the opening ports provided in the second passage are connected to the same fan, an increase in the number of fans can be suppressed. Also, there is no need to assure a large space in which the fans are installed.

In the second optical parts casing of an exemplary aspect of the present invention, the ribs may have a rib, which blocks a part of the cooling fluid to guide to the holes, on a part of outer peripheral portions of the holes.

According to this, since a part of a flow of the cooling fluid flowing peripheries of the holes formed in the outer surface portion can be guided into the inside of the holes, the optical modulator devices can be cooled effectively.

In the second optical parts casing of an exemplary aspect of the present invention, the optical parts contain optical parts constituting an illumination optical system to illuminate substantially uniformly image forming areas of the optical modulator devices. A part of the cooling fluid passing through the first passage cools the optical parts constituting the illumination optical system.

According to an exemplary aspect of the present invention, the optical parts constituting the illumination optical system are cooled by a part of the cooling fluid passing through the first passage. Therefore, it is not necessary to employ a new cooling system that cools the optical parts constituting the illumination optical system.

Also, since the optical modulator device cooled by the cooling fluid passing through the first passage modulates the color light having a small intensity of light, its calorific value is small in contrast to the optical modulator devices that modulate other color lights.

As a result, even when a part of the cooling fluid passing through the first passage is used to cool the optical parts of the illumination optical system, the optical modulator devices can be cooled sufficiently.

In the second optical parts casing of an exemplary embodiment of the present invention, a flow regulating plate to regulate a flow of the cooling fluid is provided in at least one passage in the ducts.

According to this, because the flow regulating plates are provided in the passage, uniformization of the flow rate of the cooling fluid flowing along the outer surface portion of the optical parts casing and/or uniformization of the flow rate on the perpendicular cross section to the flowing direction can be achieved. As a result, the cooling fluid can be passed uniformly and effectively along the outer surface portion of the optical parts casing. Thus cooling efficiencies of the optical parts casing and the optical modulator devices, etc. can be enhanced.

A projector of an exemplary aspect of the present invention including an illumination optical system, optical parts containing a plurality of optical modulator devices that modulate a plurality of color lights in response to image information for every color light, a projection optical system to enlarge and project a light emitted from the optical parts, an optical parts casing to house the optical parts and to arrange the optical parts at predetermined positions on an illumination optical-axis of a luminous flux emitted from the illumination optical system, an outer casing to house the illumination optical system, ducts to guide a cooling fluid to cool the plurality of optical modulator devices and fans to supply the cooling fluid to the duct; the optical parts casing having an outer surface portion that the optical parts contact, the ducts have opening ports to introduce the cooling fluid from the fans, a first passage that guides the cooling fluid from the opening ports to a first optical modulator device that modulates a color light having a small intensity of light in the plurality of color lights, and a second passage that guides the cooling fluid from the opening ports to other optical modulator devices, and the first passage being formed to surround the second passage along the outer surface portion of the optical parts casing.

According to such an exemplary aspect of the present invention, the projector achieving the same advantages (1) to (3) above can be implemented.

The projector of an exemplary aspect of the present invention may have the above first optical parts casing or the above second optical parts casing.

According to a projector of an exemplary aspect of the present invention, since the above first optical parts casing or the above second optical parts casing is provided, the same advantages as those achieved by the first optical parts casing or the second optical parts casing can be achieved.

A projector of an exemplary aspect of the present invention may have an outer casing to house the illumination optical system and the optical parts casing, ribs constituting the ducts, which guide the cooling fluid to cool the optical modulator devices, may be formed on the outer casing at positions that corresponds to the outer surface portion of the optical parts casing. The ducts may have cooling-fluid introducing opening ports. The ribs may have the rib to define the first passage that guides the cooling fluid introduced from the opening ports to one optical modulator device that modulates the color light having a small intensity of light in the plurality of color lights and the rib to define the second passage that guides the cooling fluid introduced from the opening ports to the other optical modulator devices. The ribs may have the rib to define the first passage and the rib to define the second passage may be formed along the outer surface portion such that the first passage surrounds the second passage, and the cooling fluid passing through the first passage of the ducts cools the outer surface portion of the optical parts casing.

According to this exemplary aspect of the present invention, the ducts are formed at the positions that correspond to the outer surface portion of the optical parts casing of the outer casing, while no duct is formed on the outer surface portion of the optical parts casing. Therefore, the optical parts casing used in the related art can be used.

Also, since the ducts are formed in the outer casing, reduction in the number of parts can be attained in contrast to the case that the ducts are formed as separate bodies.

The projector of an exemplary aspect of the present invention may include a fan to feed the cooling fluid to the duct.

According to this, the cooling fluid can be fed positively into the ducts by the fan. Thus, cooling efficiencies of the outer surface portion and the optical modulator devices can be enhanced.

Also, since the configuration of this application can effectively cool the outer surface portion and the optical modulator devices, the number of revolutions of the intake fan of the cooling fluid can be lowered. Also the noise generated by the revolutions of the intake fan can be reduced.

Since the cooling efficiencies of the outer surface portion and the optical modulator device can be enhanced, these parts can be sufficiently cooled even by an intake fan that has low performance. As a result, reduction of cost of the cooling system can be achieved by employing a fan whose cost is low.

In the projector of an exemplary aspect of the present invention, a rib to define the second passage is formed such that a plurality of second passages are connected to the holes to guide the cooling fluid to the other optical modulator devices formed on the outer surface portion. The cooling-fluid introducing opening ports provided in the first passage and cooling-fluid introducing opening ports provided in at least one of the plurality of second passages, are connected to the same fan.

According to an exemplary aspect of the present invention, because a plurality of second passages are formed, other optical modulator devices can be effectively cooled. For example, in some cases it is difficult for the cooling fluid to enter from the second passage according to the positions of the holes formed in the outer surface portion. Therefore, since the second second passage is formed at the position from which the cooling fluid can be readily introduced into the hole, the cooling fluid can be introduced into the hole effectively.

Also, when a plurality of second passages are formed, the fan may be connected to the passages respectively. But a number of fans are needed and thus cost is increased. Also, a large space in which a number of fans are installed is required. In the exemplary aspect of the present invention, since the opening ports provided in the first passage and the opening ports provided in the second passage are connected to the same fan, an increase in the number of the fan can be suppressed. Also, there is no need to have a large space onto which the fans are installed.

In the projector of an exemplary aspect of the present invention, a rib that blocks a part of the cooling fluid to guide the cooling fluid to the holes may be provided on a part of outer peripheral portions of the holes.

According to this, since a part of the flow of the cooling fluid flowing in the peripheries of the holes formed in the outer surface portion can be guided into the inside of the holes, the optical modulator devices can be cooled effectively.

In the projector of an exemplary aspect of the present invention, a flow regulating plate to regulate a flow of the cooling fluid may be provided in at least one passage in the ducts.

According to this, because the flow regulating plates are provided in the passage, the uniformization of the flow rate of the cooling fluid flowing along the outer surface portion of the optical parts casing and/or the uniformization of the flow rate on the perpendicular cross section to the flowing direction can be achieved. As a result, the cooling fluid can be passed uniformly and effectively along the outer surface portion of the optical parts casing. Thus cooling efficiencies of the optical parts casing and the optical modulator devices, etc. can be enhanced.

DETAILED DESCRIPTION OF EXEMPLARY EMBODIMENTS

Exemplary embodiments of the present invention will be explained with reference to the drawings hereinafter.

1-1. Configuration of Projector

Figure 1:
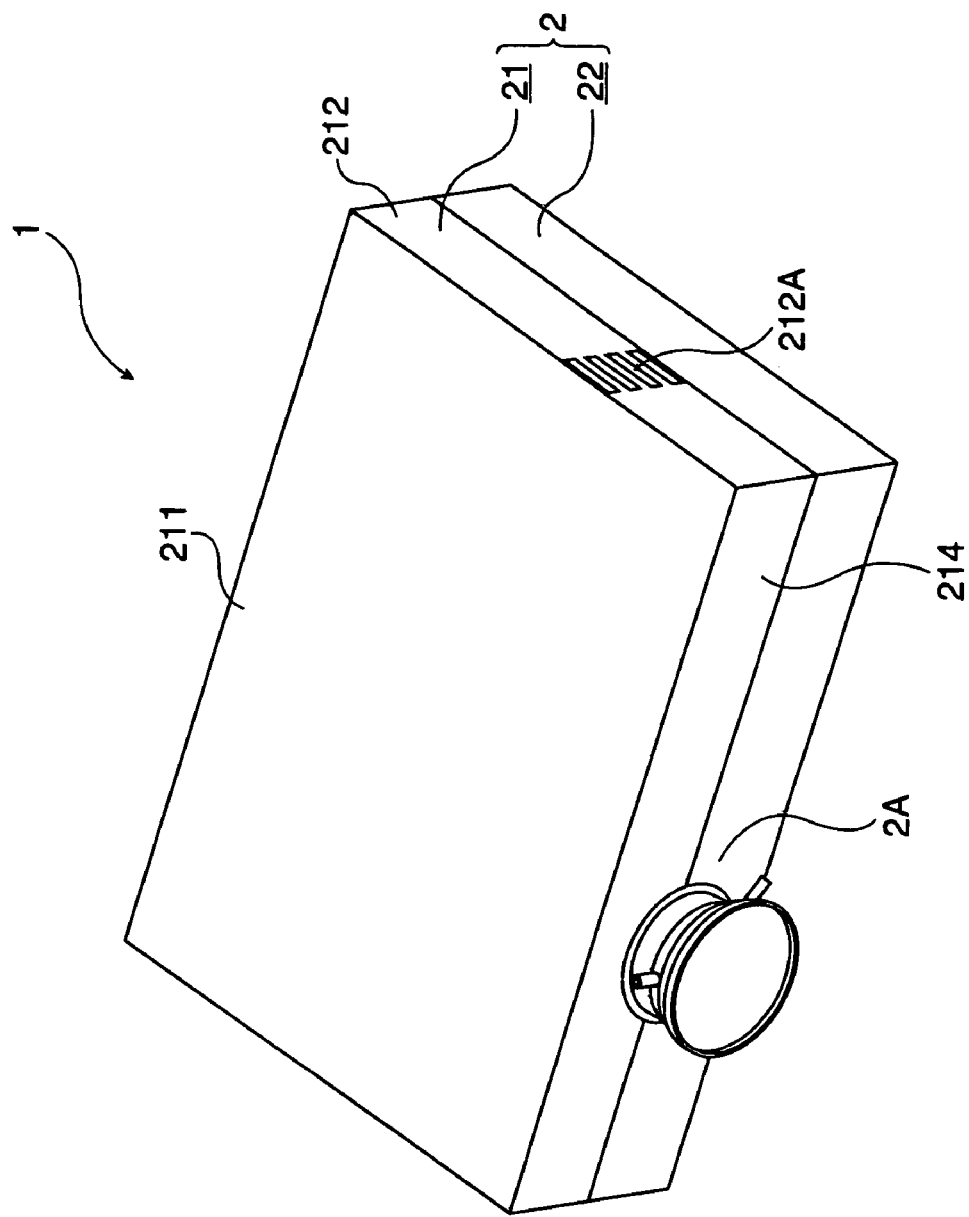
FIG. 1 is an overall schematic of a projector in a first exemplary embodiment of the present invention when viewed from the top side.
Figure 2:
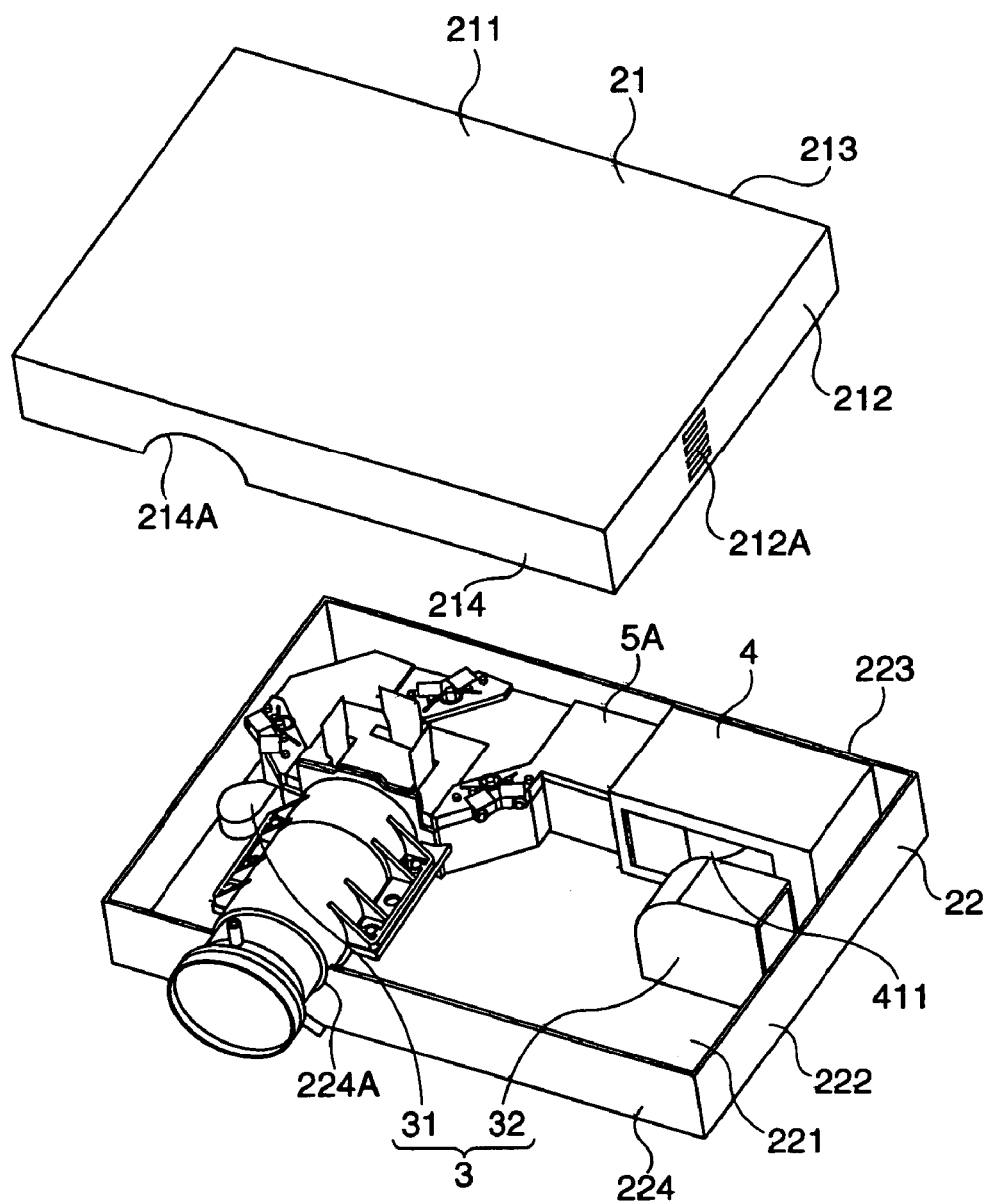
FIG. 2 is a schematic showing an internal configuration of the projector in the above exemplary embodiment.

FIG. 1 is a schematic of a projector 1 according to a first exemplary embodiment of the present invention when viewed from the top side. FIG. 2 is a schematic in which an upper case 21 is removed from the state shown in FIG. 1.

The projector 1 is constructed to include an outer case (casing) 2 having an overall shape of an almost rectangular parallelepiped, a cooling unit 3 to cool the heat stagnated in the projector 1, and an optical unit 4 to form an optical image corresponding to image information by processing optically a luminous flux emitted from a light source.

In FIG. 2, although their particular illustrations are omitted herein, a power-supply block, a lamp driving circuit, etc. are housed in spaces in the outer case 2 other than the optical unit 4.

The outer case 2 is constructed by the upper case 21 that constitutes a top surface, a front surface and side surfaces of the projector 1 respectively, and a lower case 22 that constitutes a bottom surface, side surfaces and a rear surface of the projector 1 respectively, and are made of metal respectively. These cases 21, 22 are fixed mutually by screws.

The upper case 21 is composed of an upper surface portion 211, side surface portions 212 provided around the upper surface portion, a rear surface portion 213, and a front surface portion 214.

An exhaust port 212A via which an air, being warmed in an inside of the projector 1, is exhausted by the cooling unit 3 is provided to the side surface portion 212 (the right side surface when viewed from the front side).

Although their particular illustrations are omitted herein, various equipment connection terminals, such as a computer connecting connection portion, a video input terminal, an audio equipment connection terminal, and others, are provided to the rear surface portion 213. Also, an interface substrate, on which a signal processing circuit to execute signal processing of a video signal, etc. is mounted, is arranged on the inner side of the rear surface portion 213.

A notched portion 214A is formed in the front surface portion 214, and constitutes a circular opening portion 2A when the upper case 21 is combined with the lower case 22. A part of the optical unit 4 arranged in the outer case 2 is exposed to the outside via the opening portion 2A. An optical image formed by the optical unit 4 is emitted through the opening portion 2A, and the image is displayed on a screen.

The lower case 22 is composed of a bottom surface portion 221, side surface portions 222 provided around the bottom surface portion, a rear surface portion 223, and a front surface portion 224.

An opening portion, although not shown, which is positioned under the optical unit 4 and through which a light source device described later is detachably attached is formed in the bottom surface portion 221. A lamp cover is detachably fitted to the opening portion.

Figure 10:
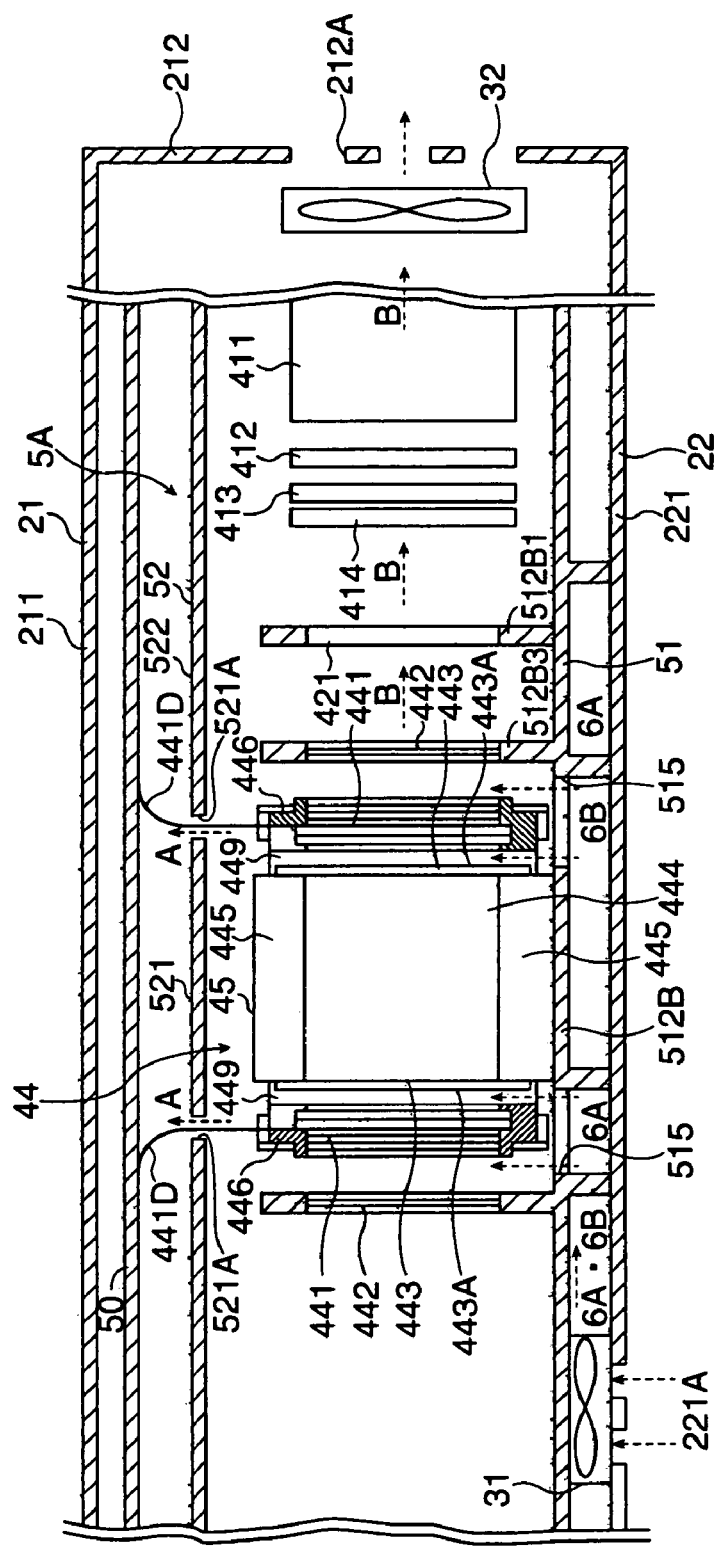
FIG. 10 is a schematic showing passages of a cooling system of the projector.

Also, an intake port 221A via which a cooling air is sucked from the outside by the cooling unit 3 is formed in the bottom surface portion 221 (see FIG. 10).

A notched portion 224A is formed in the front surface portion 224, and is coupled with the above notched portion 214A to constitute the circular opening portion 2A when the upper case 21 is combined with the lower case 22.

The cooling unit 3 feeds the cooling air to a cooling passage formed in the inside of the projector 1 to cool the heat generated in the projector 1. The cooling unit 3 is constructed to include an intake fan 31 arranged on the side of a projection lens 46 in the optical unit 4 to suck the cooling air from the intake port 221A (see FIG. 10) formed in the bottom surface portion 221 of the lower case 22, and a sirocco fan 32 positioned near a light source device 411 in the optical unit 4 to attract the air from insides of the optical unit 4 and the projector 1 and then exhaust the warmed air via the exhaust port 212A formed in the side surface portion 212 of the upper case 21.

The optical unit 4 is a unit that forms an optical image corresponding to the image information by processing optically the luminous flux emitted from the light source device 411, and includes a plurality of optical parts constituting an optical system described later and an optical parts casing 5A to house these optical parts. The optical parts casing 5A has an almost L-shaped planar shape that extends from the side surface portion 222 on the right side of the lower case 22 along the rear surface portion 223 and extends to the front surface portion 224 along the side surface portion 222 on the left side. A detailed structure of the optical parts casing 5A will be described later.

Also, although their particular illustrations are omitted herein, the optical unit 4 is electrically connected to a power supply device to which electric power is fed via a power-supply cable and which supplies a fed electric power to the light source device 411 in the optical unit 4.

A control substrate 50, to receive image information and execute control, calculate process, etc. to project the optical image in response to the image information, and also controlling respective liquid crystal panels 441R, 441G, 441B, is arranged over the optical unit 4.

Figure 3:
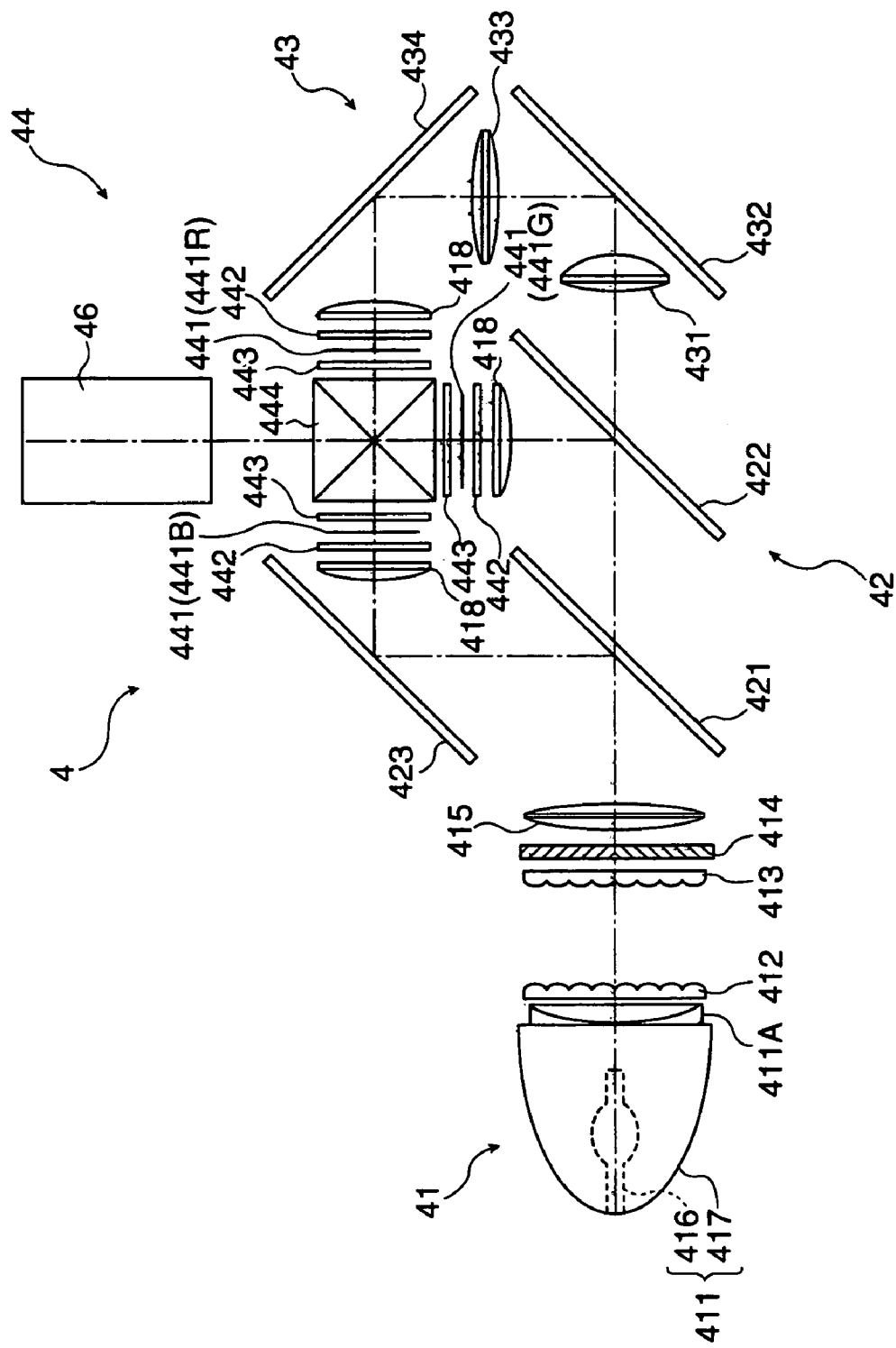
FIG. 3 is schematic view showing an optical system of the projector in the above exemplary embodiment.

An optical system of the optical unit 4 will be explained with reference to a schematic of FIG. 3 hereunder.

The optical unit 4 includes an integrator illumination optical system 41, a color separation optical system 42, a relay optical system 43, an optical device 44, and the projection lens 46.

The integrator illumination optical system 41 is an optical system that illuminates substantially uniformly image forming areas of three sheets of liquid crystal panel 441 (indicated as liquid crystal panels 441R, 441G, 441B for every color light of red, green, and blue respectively) constituting the optical device 44, and includes the light source device 411, a first lens array 412, a second lens array 413, a polarization-transforming optical element 414, and a superposing lens 415.

Among them, the light source device 411 has a light source lamp 416 as a light source to emit radial light beams, an ellipsoidal mirror 417 to reflect radiation lights emitted from the light source lamp 416, and a parallelizing concave lens 411A to transform the light beams emitted from the light source lamp 416 and then reflected by the ellipsoidal mirror 417 into parallel beams. In the present exemplary embodiment, a super-high pressure mercury lamp is used as the light source lamp 416.

In this case, a UV filter (not shown) is provided to a flat surface portion of the parallelizing concave lens 411A. Also, a paraboloidal mirror may be used instead of the ellipsoidal mirror 417 and the parallelizing concave lens 411A.

Also, the first lens array 412, the second lens array 413, and the polarization-transforming optical element 414 are combined integrally, and then installed into the optical parts casing 5A and fixed thereto.

The first lens array 412 has a configuration in which small lenses, each having an almost rectangular profile when viewed in the optical-axis direction, are aligned in a matrix. Each small lens divides a luminous flux emitted from the light source lamp 416 into a plurality of partial luminous fluxes. A profile shape of each small lens is set to have an almost similar figure to a shape of the image forming area of the liquid crystal panel 441.

The second lens array 413 has a configuration that is almost similar to the first lens array 412, and has a configuration in which small lenses are aligned in a matrix. The second lens array 413, together with the superposing lens 415, has a function of focusing images of respective small lens array 412 onto the liquid crystal panel 441.

The polarization-transforming optical element 414 is arranged between the second lens array 413 and the superposing lens 415, and is constructed integrally with the second lens array 413 as a unit. Such polarization-transforming optical element 414 transforms the light from the second lens array 413 into one type polarized light. Thus, a utilization factor of the light in the optical device 44 is enhanced.

Particularly, respective partial lights, being converted into one type polarized light by the polarization-transforming optical element 414, are superposed finally onto the liquid crystal panels 441R, 441G, 441B of the optical device 44 by the superposing lens 415. In the projector using the liquid crystal panel of the type that modulates the polarized light, since only the polarized light of one type can be utilized, almost half of the lights emitted from the light source lamp 416 that generates random polarized lights cannot be utilized.

Therefore, the emergent light, emitted from the light source lamp 416, is converted into almost one type polarized light by using the polarization-transforming optical element 414 to enhance a utilization factor of the light in the optical device 44. In this case, such polarization-transforming optical element 414 has been reviewed in JP-A-8-304739, for example.

The color separation optical system 42 has two sheets of dichroic mirrors 421, 422 and a reflecting mirror 423, and has a function of separating a plurality of partial luminous fluxes, being emitted from the integrator illumination optical system 41, into three color lights of red, green, and blue by the dichroic mirrors 421, 422.

The relay optical system 43 has an incident-side lens 431, a relay lens 433, and reflecting mirrors 432, 434, and has a function of introducing the color light, the red light separated by the color separation optical system 42 to the liquid crystal panel 441R.

At this time, a blue light component of the luminous flux emitted from the integrator illumination optical system 41 is reflected by the dichroic mirror 421 of the color separation optical system 42. But a red light component and a green light component are transmitted through the same. The blue light reflected by the dichroic mirror 421 is reflected by the reflecting mirror 423 and then passed through a field lens 418 to come up to the blue-color liquid crystal panel 441B. This field lens 418 converts respective partial luminous fluxes emitted from the second lens array 413 into the luminous fluxes in parallel with the center axis (principal ray). This is true of the field lenses 418 provided to the light-incident side of other liquid crystal panels 441G, 441R.

Out of the red light and the green light transmitted through the dichroic mirror 421, the green light is reflected by the dichroic mirror 422 and then passed through the field lens 418 to reach the green-color liquid crystal panel 441G. While, the red light is transmitted through the dichroic mirror 422 to pass through the relay optical system 43, and then passed through the field lens 418 to arrive at the red-color liquid crystal panel 441R. In this case, the reason why the relay optical system 43 is used to feed the red light is that, because an optical path length of the red light is longer than an optical path lengths of other color lights, reduction of a utilization factor of the light due to the divergence of light, etc. should be reduced or prevented. That is, the partial luminous flux incident on the incident-side lens 431 should be fed to the field lens 418 as it is.

In this case, the relay optical system 43 is constructed to pass the red light of the three color lights. Such a system is not limited to this structure, and may be constructed to pass the blue light.

The optical device 44 includes three incident-side polarizing plates 442 upon which respective color lights separated by the color separation optical system 42 are incident, the liquid crystal panels 441R, 441G, 441B arranged in the subsequent stage of respective incident-side polarizing plates 442 as the optical modulator, emergent-side polarizing plates 443 arranged in the subsequent stage of respective liquid crystal panels 441R, 441G, 441B, and a cross dichroic prism 444 (color synthesis optical device) serving as the color synthesis optical system.

The liquid crystal panels 441R, 441G, 441B use a polysilicon TFT, for example, as a switching element. Respective color lights, separated by the color separation optical system 42, are modulated in response to the image information, by three sheets of liquid crystal panels 441R, 441G, 441B, the incident-side polarizing plates 442, and the emergent-side polarizing plates 443, to form the optical image.

Although described later, each of the liquid crystal panels 441R, 441G, 441B includes a driving substrate having TFT switching elements arranged in a matrix, and pixel electrodes to which the voltage is applied by the switching elements, and an opposing substrate having opposing electrodes corresponding to the pixel electrodes.

The incident-side polarizing plate 442 transmits only the polarized light in a predetermined direction and absorbs other luminous fluxes of respective color lights separated by the color separation optical system 42. A polarizing film is applied onto the substrate made of a sapphire glass, or the like. Also, the polarizing film may be pasted onto the field lens 418 without the substrate.

The emergent-side polarizing plate 443 is constructed in almost the same way as the incident-side polarizing plate 442. A polarizing film 443A is pasted onto a substrate 443B made of the sapphire glass, or the like (see FIG. 5). The emergent-side polarizing plate 443 transmits only the polarized light in a predetermined direction and absorbs other luminous fluxes out of the luminous fluxes emitted from the liquid crystal panel 441 (441R, 441G, 441B). In this case, the polarizing film may be pasted onto the cross dichroic prism 444 without the substrate.

The incident-side polarizing plates 442 and the emergent-side polarizing plates 443 are positioned such that their mutual directions of polarization axes are intersected orthogonally.

The cross dichroic prism 444 forms the color image by synthesizing images that are modulated for every color light being emitted from three sheets of the liquid crystal panels 441R, 441G, 441B respectively. In this case, a dielectric multi-layered film to reflect the red light and a dielectric multi-layered film to reflect the blue light are formed like an almost X-shape along boundaries of four right-angle prisms in the cross dichroic prism 444, and three color lights are synthesized by these dielectric multi-layered films. Then, the color image that is synthesized by the prism 444 is emitted from the projection lens 46 and enlarged/projected on a screen.

The liquid crystal panel 441, the emergent-side polarizing plates 443, and the cross dichroic prism 444, as explained above, are constructed as an optical device main body 45 that is formed integrally as a unit.

Figure 4:
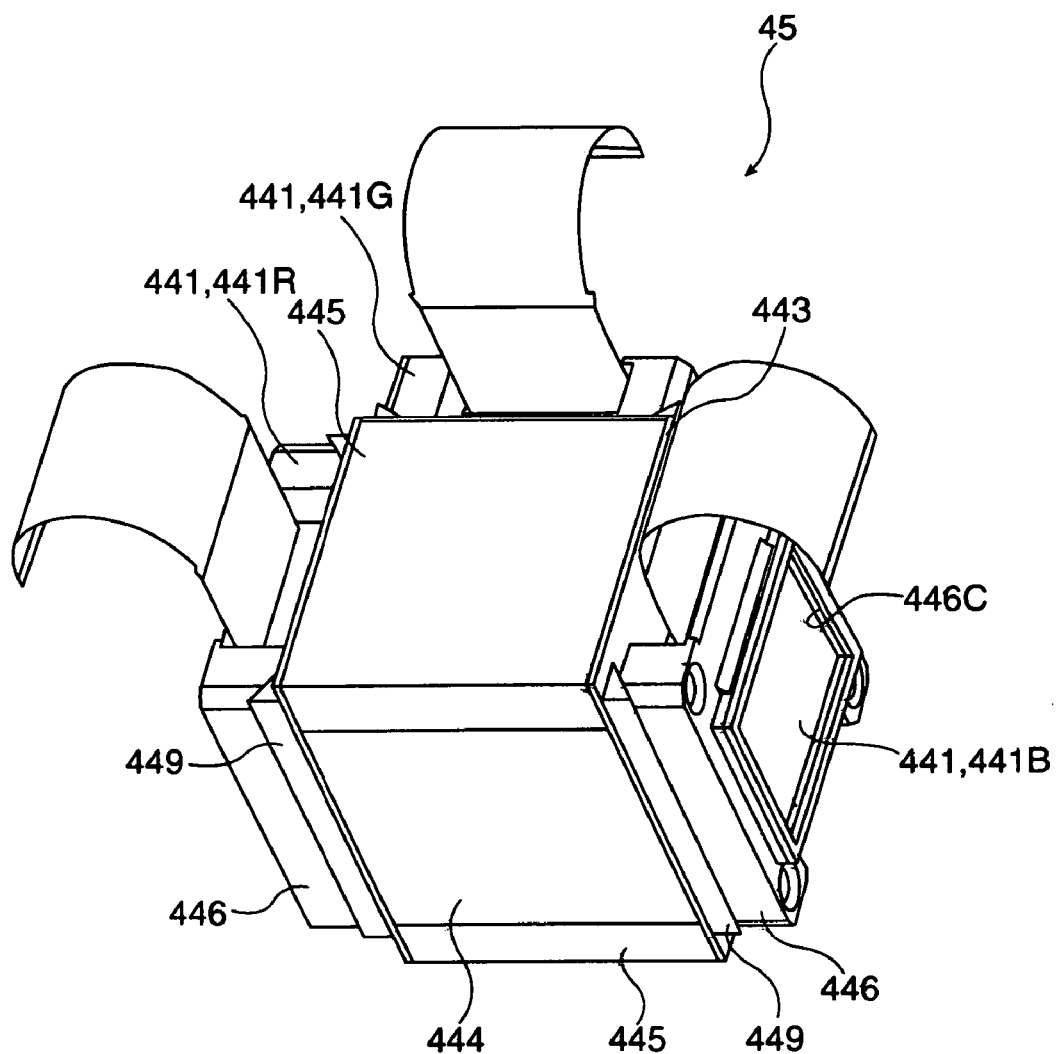
FIG. 4 is a schematic of an optical device main body.
Figure 5:
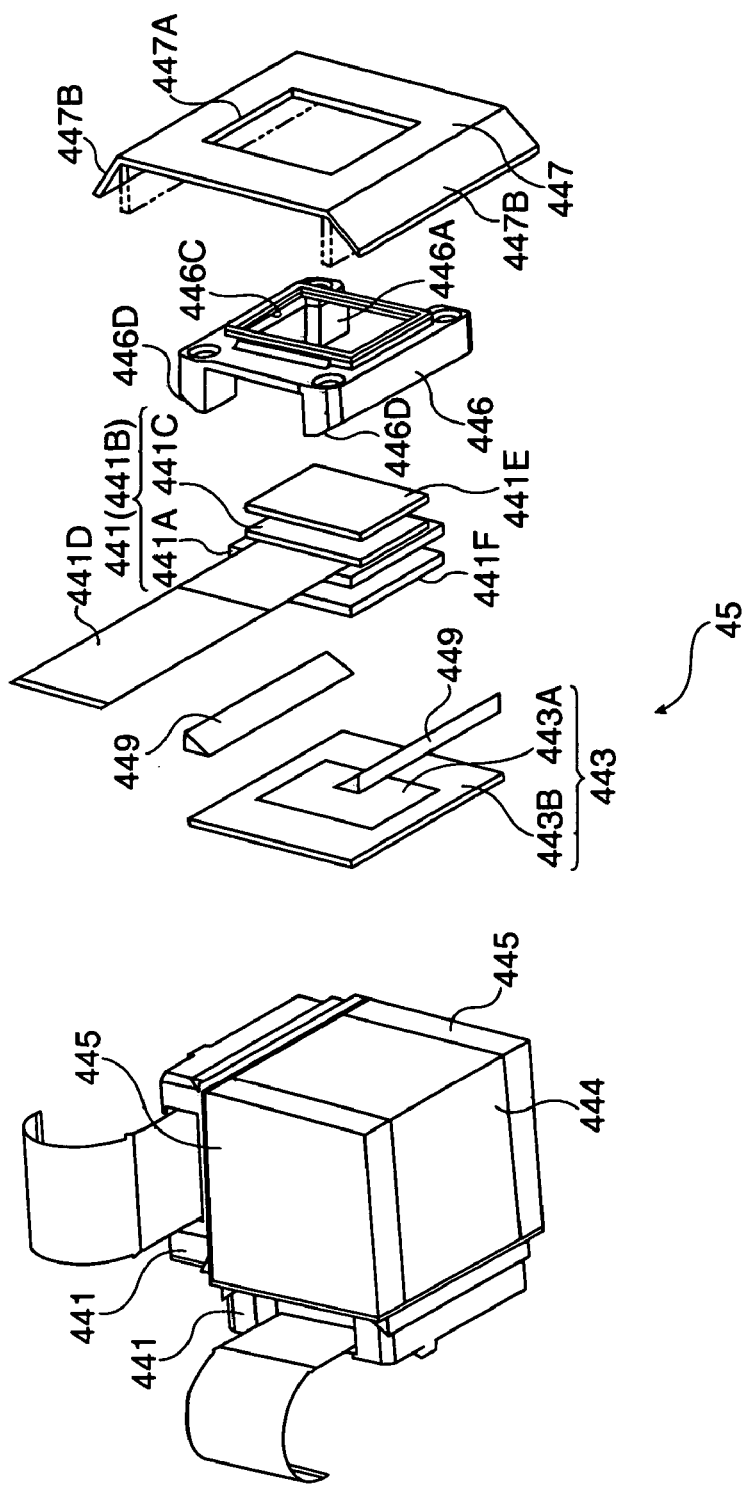
FIG. 5 is a schematic of the optical device main body.

As shown in FIG. 4 and FIG. 5, the optical device main body 45 includes pedestals 445, a holding frame 446, thermal conduction plates 447, and spacers 449, in addition to the cross dichroic prism 444, the liquid crystal panel 441, and the emergent-side polarizing plates 443. In this case, the thermal conduction plate 447 is omitted from FIG. 4.

The pedestal 445 fixes the optical device main body 45 to the optical parts casing 5A, and is fixed to both upper and lower surfaces of the cross dichroic prism 444. The pedestal 445 is made of aluminum with high thermal conductivity. Its outer peripheral shape is almost identical to the cross dichroic prism 444.

Here, in the present exemplary embodiment, the pedestal 445 is made of the aluminum. But such material is not limited to this aluminum. Such a pedestal may be formed of a material with a high thermal conductivity, such as magnesium alloy, copper, or the like, or sapphire, quartz, fluorite, thermal-conductive resin, or the like.

The holding frame 446 has a concave container portion 446A in which the liquid crystal panel 441 is contained.

Also, an opening portion 446C is provided to the holding frame 446 at a position that coincides with the panel surface of the contained liquid crystal panel 441. A portion exposed from this opening portion 446C serves as the image forming area. Specifically, respective color lights R, G, B are introduced into this portion of the liquid crystal panel 441 to form the optical image in response to the image information.

An inclined surface 446D is formed at left and right corners of a luminous flux emitting end surface of the holding frame 446 respectively. The spacers 449 are arranged to oppose the inclined surfaces 446D.

Here, the liquid crystal panel 441 will be explained. The liquid crystal panel 441 is constructed by sealing the liquid crystal between a driving substrate 441A (e.g., a substrate on which a plurality of line electrodes, electrodes constituting the pixels, and TFT elements electrically connected between them are formed) and an opposing substrate 441C (e.g., a substrate on which a common electrode is formed). Then, control cables 441D are extended from spaces between these substrates 441A, 441C. Also, a transparent emergent-side dustproof plate 441E and an incident-side dustproof plate 441F are secured to surfaces of these substrates 441A or 441C.

The emergent-side dustproof plate 441E and the incident-side dustproof plate 441F are formed of a plate body having good thermal conduction, such as sapphire, quartz, or the like. On the luminous flux emitting side and the luminous flux incident side of the liquid crystal panel 441, the dustproof plates 441E, 441F have a function of deviating a position of the panel surface of the liquid crystal panel 441 from a back focus position of the projection lens 46 to make the dusts adhered onto the panel surface not optically prominent.

In this case, a frame is formed by thermal conductive silicon-based adhesives on outer peripheries of the emergent-side dustproof plate 441E and the incident-side dustproof plate 441F. Thus, a side surface of the container portion 446A of the holding frame 446 and an inner periphery of the opening portion 446C are adhered to the outer peripheries of the emergent-side dustproof plate 441E and the incident-side dustproof plate 441F.

The thermal conduction plate 447 is a plate material made of aluminum, has an opening portion 447A that conforms with the opening portion 446C of the holding frame 446, and is fixed to tightly contact the luminous flux incident-side surface of the holding frame 446.

The thermal conduction plate 447 is extended sideward along the luminous flux incident surface of the liquid crystal panel 441 contained in the holding frame 446, and folded portions 447B folded toward the liquid crystal panel 441 side are provided to both end portions in the extended direction. The folded portions 447B are formed to have a folding angle of below 90 degrees as a predetermined angle, and contact wall portions 513B, 514B of thermal conduction frames 513, 514 described later in the state that the optical device main body 45 is attached to a predetermined position of the optical parts casing 5A and then is folded by almost 90 degrees (see FIG. 7).

In this case, the thermal conduction plate 447 is made of the aluminum, but such a plate is not limited to this material. The plate may be formed of one of copper, magnesium, and an alloy containing them.

The spacers 449 are interposed between the holding frame 446 and the substrate 443B of the emergent-side polarizing film 443 to adjust a position of the holding frame 446. The spacer 449 has an almost triangular sectional shape, and is formed of resins, such as acryl, urethane, or the like having a thermal insulating property.

Two spacers 449 are arranged on each holding frame 446 (six in total) respectively, and contact the inclined surfaces 446D of the holding frame 446. The holding frame 446 is moved by moving the spacers 449 to adjust positions of respective liquid crystal panels 441R, 441G, 441B at the back focus position from the projection lens 46.

1-2. Configuration of the Optical Parts Casing

Figure 6:
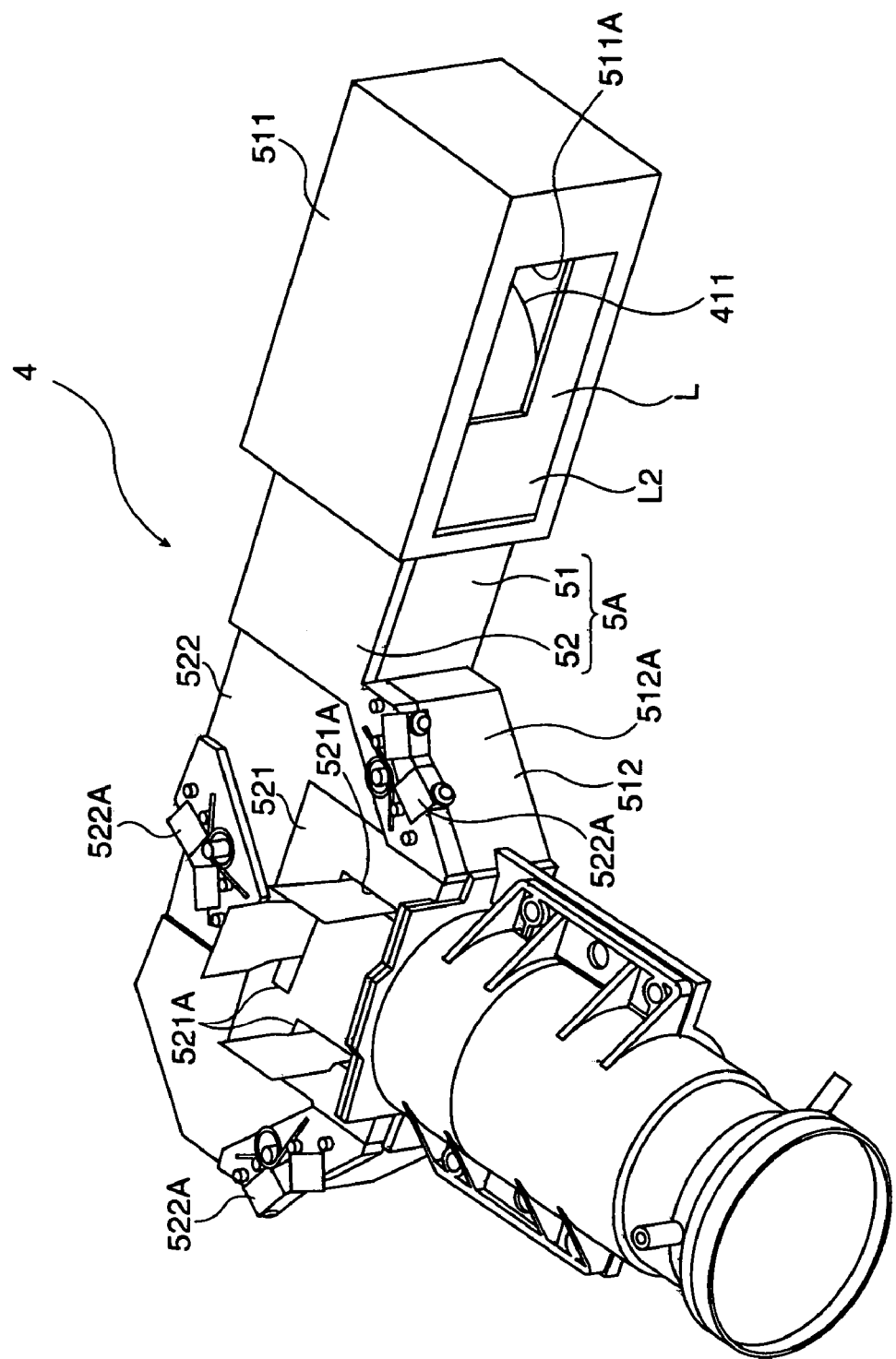
FIG. 6 is a schematic showing an optical unit.

The optical parts casing 5A of the optical unit 4 is shown in FIG. 6.

The optical parts casing 5A arranges respective optical parts 411A, 412 to 415, 418, 421 to 423, 431 to 434, 441 to 444, 46 at predetermined positions on the illumination optical axis of the luminous flux emitted from the light source lamp 416. The optical parts casing 5A is made of thermal conductive material, e.g., metal, such as aluminum alloy, or the like, and includes a lower light guide 51 to house the light source lamp 416, the ellipsoidal mirror 417, respective optical parts 411A, 412 to 415, 418, 421 to 423, 431 to 434, 441 to 444, 46 therein and a plate-like upper light guide 52 provided on this lower light guide 51.

The lower light guide 51 has a light-source housing portion 511 to house the light source lamp 416 and the ellipsoidal mirror 417 therein and an optical parts housing portion 512 to house respective optical parts 411A, 412 to 415, 418, 421 to 423, 431 to 434, 441 to 444, 46 therein.

The light-source housing portion 511 will be explained with reference to FIG. 6 through FIG. 8 hereunder.

The light-source housing portion 511 is formed like a box shape in which an opening portion 511B is formed on the bottom surface side and a rectangular opening portion 511A is formed on the inner side. The light-source housing portion 511 houses a lamp housing L in which the light source lamp 416 and the ellipsoidal mirror 417 are contained. The lamp housing L is fitted via the opening portion 511B formed on the bottom surface side. The lamp housing L has a base portion L1 that is attached to the light-source housing portion 511, and a side portion L2 provided to stand upright from the base portion L1.

The side portion L2 has different height dimensions along the luminous flux emitted from the light source lamp 416. A height dimension from a center portion to a front portion of the ellipsoidal mirror 417 is set equal to a height dimension of an upper surface portion from the bottom surface portion of the light-source housing portion 511, and a rear portion of the ellipsoidal mirror 417 is formed lower than the height dimension.

In the state that the lamp housing L is housed in the light-source housing portion 511, a front portion of the ellipsoidal mirror 417 is brought into its closed state by the opening portion 511A and the side portion L2 while a rear portion is brought into its ventilated state.

A leakage of the luminous flux emitted from the light source lamp 416 to the outside can be reduced or prevented by the closed state at the front portion of the ellipsoidal mirror 417. The heat generated from the light source lamp 416 in the light-source housing portion 511 does not stagnate by state at the rear portion when in the ventilated state.

Next, the optical parts housing portion 512 will be explained with reference to FIG. 6 to FIG. 9 hereunder.

The optical parts housing portion 512 arranges respective optical parts 411A, 412 to 415, 418, 421 to 423, 431 to 434, 441 to 444, 46 at predetermined positions on the illumination optical axis of the luminous flux emitted from the light source lamp 416. The optical parts housing portion 512 has an opening portion through which the optical parts are housed, a bottom surface portion 512B arranged to oppose to this opening portion, and a side surface portion 512A provided to stand upright from the bottom surface portion 512B. The side surface portion 512A and the bottom surface portion 512B constitute an outer surface portion of the optical parts casing 5A.

Figure 7:
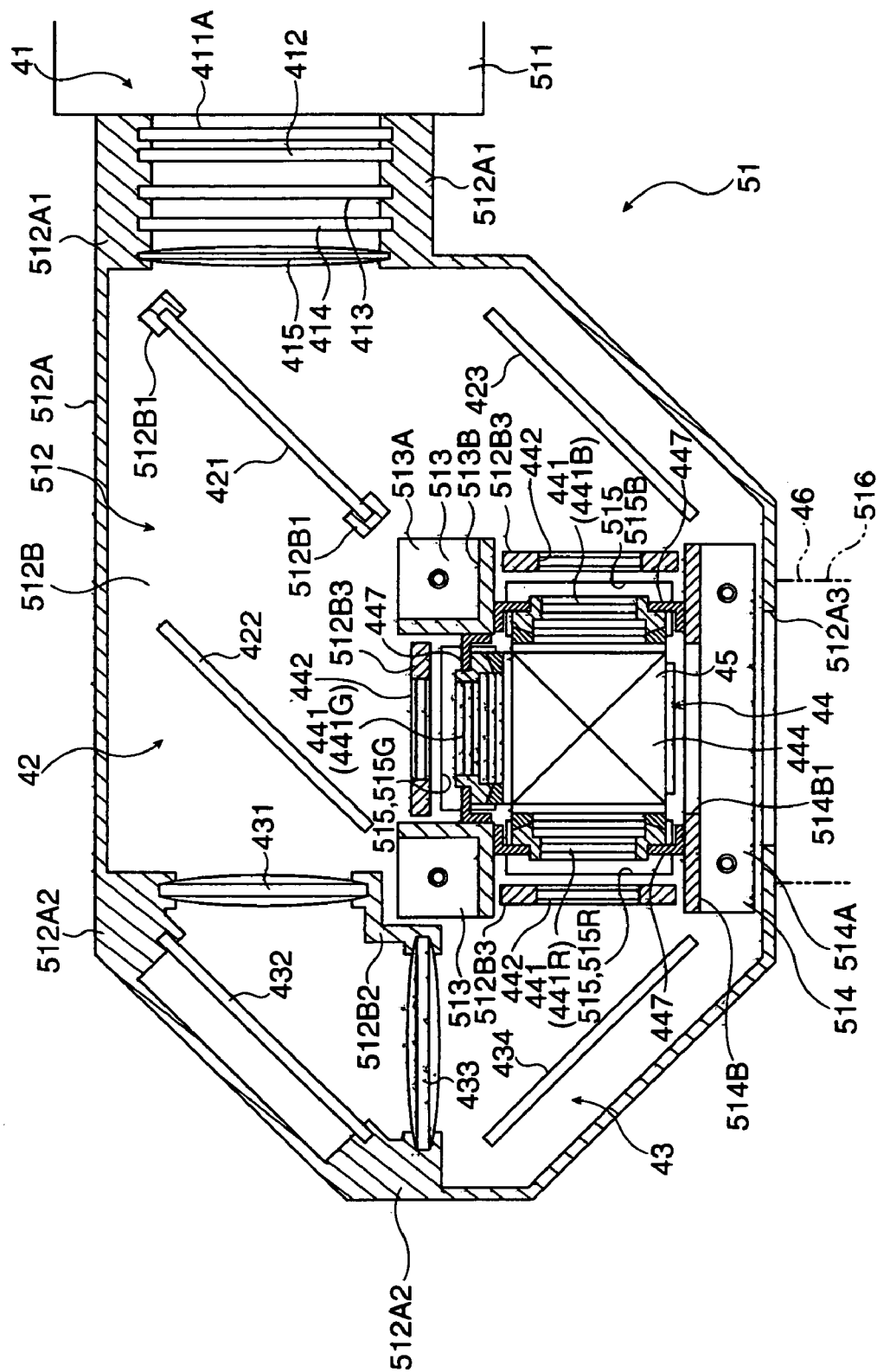
FIG. 7 is a schematic showing an interior of the optical unit.
Figure 8:
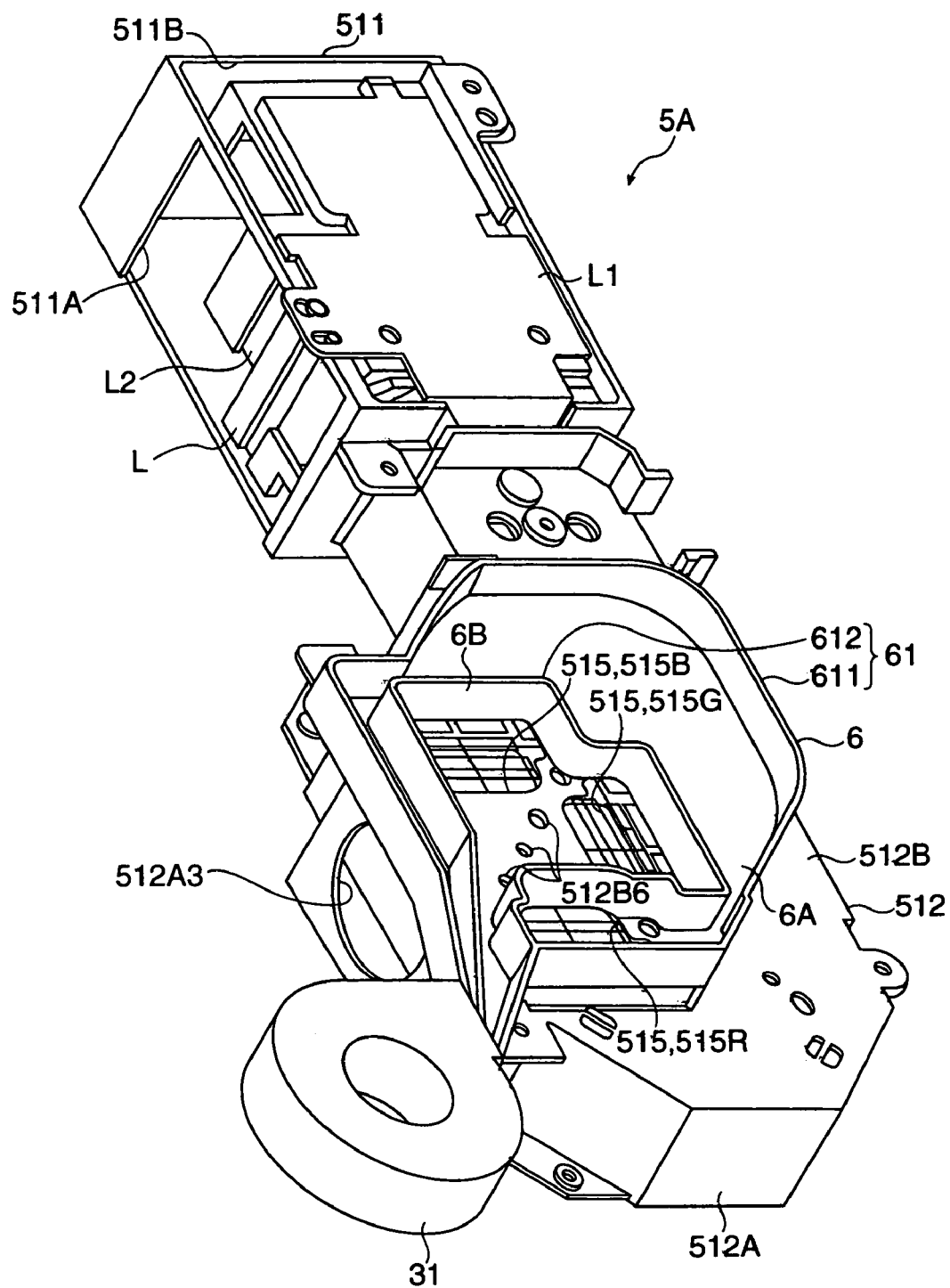
FIG. 8 is a schematic of an optical parts casing when viewed from the bottom portion side.

As shown in FIG. 7, the parallelizing concave lens 411A, a unit including integrally the first lens array 412, the second lens array 413, and the polarization-transforming optical element 414, a first groove portion 512A1 into which the superposing lens 415 is fitted to slide from the top, and a second groove portion 512A2 into which the incident-side lens 431, the reflecting mirror 432, and the relay lens 433 are fitted to slide from the top are formed on the inner side surface of the side surface portion 512A.

Also, a circular hole 512A3 is formed in a front portion of the side surface portion 512A so as to respond to the luminous-flux emitting position from the optical device 44. A projection-lens installing portion 516 is attached to the luminous-flux emitting side of the hole 512A3. The projection lens 46 is installed onto the projection-lens installing portion 516 to enlarge/project the luminous flux from the optical device 44.

A first boss portion 512B1 to support the dichroic mirrors 421, a second boss portion 512B2 having a groove that corresponds to the second groove portion 512A2, and a polarizing-plate holder 512B3 to support the incident-side polarizing plates 442 are provided to the bottom surface portion 512B to project therefrom. The polarizing-plate holder 512B3 may be formed of thermal conductive material, e.g., a metal, such as an aluminum alloy, or the like.

Holes 515 formed to correspond to the position of the liquid crystal panel 441 of the optical device 44 and having an almost rectangular planar shape (a hole corresponding to the liquid crystal panel 441R is assumed as a hole 515R, a hole corresponding to the liquid crystal panel 441G is assumed as a hole 515G, and a hole corresponding to the liquid crystal panel 441B is assumed as a hole 515B), and holes 512B6 formed in center portions surrounded by the holes 515 (see FIG. 8) are formed on the bottom surface portion 512B. The holes 512B6 are used to fix the optical device main body 45.

Also, the thermal conduction frames 513, 514 are attached to the bottom surface portion 512B to correspond to the liquid crystal panel 441 of the optical device 44. The thermal conduction frames 513 are provided to two locations on the side of the liquid crystal panels 441R, 441G and the side of the liquid crystal panels 441G, 441B, while the thermal conduction frame 514 is provided on the side of the liquid crystal panels 441R, 441B and on the luminous-flux emitting side of the optical device 44. The thermal conduction frames 513, 514 are moved back and forth along the bottom surface portion 512B.

The thermal conduction frames 513, 514 are formed of a metal, such as aluminum alloy, or the like or a material with high thermal conductivity, such as thermal conductive resin, or the like, and have attaching portions 513A, 514A formed along the bottom surface portion 512B of the lower light guide 51 and the wall portions 513B, 514B as a wall body.

The wall portions 513B, 514B of the thermal conduction frames 513, 514 are arranged to oppose mutually by interposing the liquid crystal panel 441 therebetween. The above-mentioned thermal conduction plates 447 come into contact with these wall portions 513B, 514B. Also, a rectangular hole 514B1 is formed in the wall portion 514B of the thermal conduction frame 514 in registration with the luminous-flux emitting position from the optical device 44.

Figure 9:
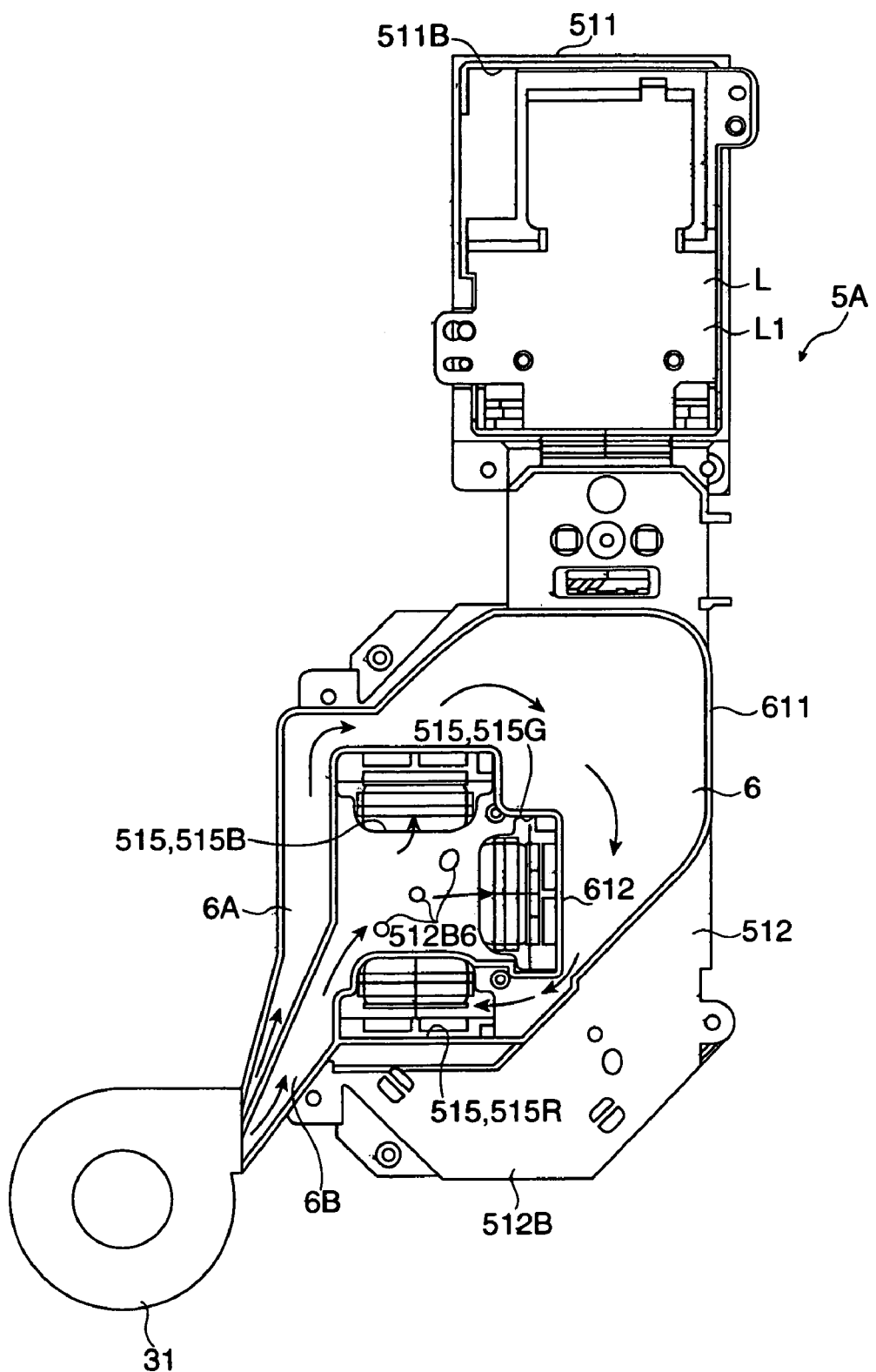
FIG. 9 is a schematic of the optical parts casing when viewed from the bottom portion side.

The back surface side of the bottom surface portion 512B will be explained in detail with reference to FIG. 8 and FIG. 9 hereunder. In this case, the optical parts housing portion 512 is shown in FIG. 8 and FIG. 9 in a state that the projection-lens installing portion 516 is removed therefrom.

A duct 6 is formed on the back surface of the bottom surface portion 512B. This duct 6 guides cooling air from the intake fan 31 to the optical device 44 containing the liquid crystal panels 441R, 441G, 441B in the inside of the optical parts casing 5A. An opening port of the duct 6 is connected to the intake fan 31.

In this case, the duct 6 and the intake fan 31 act as a cooling system that cools the optical device 44 containing the liquid crystal panel 441.

The duct 6 has a rib (outer peripheral wall) 61 that is provided to stand vertically from the back surface of the bottom surface portion 512B. This rib 61 has a first rib (first outer peripheral wall) 611 to surround the lower portion of the optical device 44 and lower portions of the dichroic mirrors 421, 422, and a second rib (second outer peripheral wall) 612 provided on the inside of this first rib 611.

Both end portions of the first rib 611 are connected to the intake fan 31, and the opening port of the duct 6 is formed by these end portions.

Also, the second rib 612 surrounds a lower portion of the cross dichroic prism 444 and the lower portions of the liquid crystal panels 441B, 441G out of the lower portion of the optical device 44. The second rib 612 surrounds integrally the lower portion of the cross dichroic prism 444 and peripheries of the holes 515B, 515G, but does not surround a periphery of the hole 515R.

One end portion of the second rib 612 is arranged between both end portions of the first rib 611 and connected to the intake fan 31, while the other end portion is connected to a neighboring portion of the hole 515R of the first rib 611.

A range that is surrounded by the second rib 612 is present in a range that is surrounded by the first rib 611.

The duct 6 is completed when the bottom surface portion 221 of the lower case 22 is brought into contact with the first rib 611 and the second rib 612.

Here, a portion of the duct 6 formed between the first rib 611 and the second rib 612 denotes a first passage 6A, and a portion surrounded by the second rib 612 denotes a second passage 6B.

Next, returning to FIG. 6, the upper light guide 52 will be explained hereunder. The upper light guide 52 closes the opening port of the optical parts housing portion 512 of the lower light guide 51, and has a first upper light guide 521 arranged over the optical device 44, and a second upper light guide 522 arranged in portions except that portion.

Three holes 521A to exhaust the cooling air are formed in the first upper light guide 521 at positions that correspond to the liquid crystal panel 441.

The second upper light guide 522 supports the optical parts that are never supported by the first groove portion 512A1 and the second groove portion 512A2 of the lower light guide 51, the reflecting mirror 423, the dichroic mirror 422, and the reflecting mirror 434.

Adjusting portions 522A are provided to portions that correspond to the optical parts positions of the second upper light guide 522. Attitudes of the optical parts are adjusted by the adjusting portions 522A, and therefore illumination optical axes of respective color lights can be adjusted.

1-3. Cooling Configuration by the CoolingUnit

Next, the cooling configuration of such projector 1 will be explained hereunder. The projector 1 includes a panel cooling system A to mainly cool the optical device 44, and a light-source cooling system B to mainly cool the light source device 411.

The panel cooling system A will be explained with reference to FIG. 9 and FIG. 10.

In the panel cooling system A, the cooling air being sucked from the intake port 221A of the lower case 22 is supplied to the opening port of the duct 6 by the intake fan 31. A part of the cooling air supplied to this opening port is introduced into the first passage 6A. The cooling air flows clockwise in FIG. 9, and circulates through the lower portions of the dichroic mirrors 421, 422 on the bottom surface portion 512B of the lower light guide 51 to cool the bottom surface portion 512B. Then, the cooling air is introduced into the hole 515R formed at the position corresponding to the liquid crystal panel 441R that modulates the red light having a color light of small intensity of light in respective color lights separated by the color separation optical system 42. Then, as shown in FIG. 10, the cooling air enters into either clearances between the emergent-side polarizing plates 443 and the holding frame 446 or the luminous-flux incident side of the holding frame 446 to cool the luminous-flux emergent-side and the luminous-flux incident-side of the liquid crystal panel 441R, the holding frame 446, and the polarizing plates 442, 443.

Now, the color light having a small intensity of light will be explained hereunder. For instance, when the super-high pressure mercury lamp or a part of metal halide lamps is used as the light source lamp 416, the red light is given as the color light having a small intensity of light. Also, when the halogen lamp or a metal halide lamp is used as the light source, the blue light is given as the color light having a small intensity of light. In this case, an intensity of light in this application signifies an energy that is derived by an integrated value for every wavelength range of each color light of the light emitted from the light source. Therefore, the liquid crystal panel, which is cooled by the cooling air in the first passage 6A after such air cools the bottom surface portion 512B of the lower light guide 51, corresponds to the liquid crystal panel on which the color light having a small energy in wavelength ranges of respective color lights is incident, i.e., the liquid crystal panel to which a small calorific value is given by the incident light.

A part of the other portion of the cooling air being introduced into the opening port of the duct 6 is supplied to the second passage 6B (see FIG. 9). This cooling air is introduced into the holes 515G, 515B formed to mate with the liquid crystal panels 441G, 441B. In this case, the cooling air in the second passage 6B contacts the lower portion of the cross dichroic prism 444 of the optical device 44 on the bottom surface portion 512B. However, since the optical parts casing 5A is formed of thermal conductive material, e.g., metal, not only portions of the bottom surface portion 512B to which the heat is transferred from the optical device 44 are locally heated at a high temperature, but the heat is dispersed into overall areas of the bottom surface portion 512B. Therefore, the cooling air in the second passage 6B contacts the portion to which the heat of the optical device 44 is transferred, but this contact area is small. Thus, sufficient heat exchange is not carried out between the bottom surface portion 512B and the cooling air during the period when the cooling air is passed through the lower portion of the optical device 44. As a result, even the cooling air that is passed through the lower portion of the optical device 44, i.e., the portion to which the heat is transferred, can cool the liquid crystal panels 441G, 441B.

Also, the first passage 6A surrounds the outer side of the second passage 6B, and the cooling air in the first passage 6A comes into contact with the bottom surface portion 512B to be spread into a wide range. Therefore, sufficient heat exchange is carried out between the cooling air in the first passage 6A and the bottom surface portion 512B, and the heat can be radiated sufficiently from the bottom surface portion 512B.

Then, as shown in FIG. 10, this cooling air enters into either clearances between the emergent-side polarizing plates 443 and the holding frame 446 or the luminous-flux incident side of the holding frame 446 to cool the luminous-flux emergent-side and the luminous-flux incident-side of the liquid crystal panels 441G, B, the holding frame 446, and the polarizing plates 442, 443.

As described above, the air that cooled the liquid crystal panel 441 and so forth is exhausted from the holes 521A of the first upper light guide 521 to the outside of the optical parts casing 5A while cooling the pedestal 445 fixed over the cross dichroic prism 444.

The air being exhausted to the optical parts casing 5A is then exhausted into a space between the upper light guide 52 and the control substrate 50 arranged over the upper light guide 52.

Here, the cooling air being supplied by the panel cooling system A has not only a role of cooling the optical device 44 but also a role of blowing off dust, etc. stuck onto the panel surfaces, because such air is blown upon surfaces of the liquid crystal panels 441R, 441G, 441B. Since the surfaces of the liquid crystal panels 441R, 441G, 441B can always be cleaned by the panel cooling system A, the optical image of stable picture quality can be projected onto a screen, etc. by the projector 1.

In the light-source cooling system B, as shown in FIG. 2, the sirocco fan 32 provided near the light source device 411 is used.

A suction port of the sirocco fan 32 is arranged to be opposed to a clearance that is formed by the opening portion 511A formed in the side surface of the light-source housing portion 511 of the lower light guide 51 and the side portion L2 of the lamp housing L.

As shown in FIG. 10, a part of the air that cools the optical device 44 in the panel cooling system A is drawn up to the rear side of the light source device 411 by the sirocco fan 32 via the inside of the optical parts casing 5A.

The air is passed through spaces among the first lens array 412, the second lens array 413, and the polarization-transforming optical element 414, which are constructed integrally, in the course of drawing air by the sirocco fan 32 to cool them. Then, the air enters into the inside of the light source device 411 to cool the light source lamp 416 and the ellipsoidal mirror 417.

At this time particularly, the polarization-transforming optical element 414 generates a large quantity of heat because the luminous fluxes are irradiated from the light source lamp 416. Therefore, it is effective with respect to stable operation and durability enhancement of the optical unit 4 to cool the polarization-transforming optical element 414.

The air that cooled the polarization-transforming optical element 414 and the light source device 411 is drawn by the sirocco fan 32 to pass through a clearance formed between the opening portion 511A formed in the side surface of the light-source housing portion 511 of the lower light guide 51 and the side portion L2 of the lamp housing L, and then is exhausted via the exhaust port 212A formed in the side surface portion 212 of the upper case 21.

1-4. Radiation Routes of the Optical Unit

Next, the radiation routes of the optical unit 4 will be explained hereunder.

The heat is generated in the liquid crystal panels 441R, 441G, 441B of the optical device 44 and the emergent-side polarizing plates 443, the cross dichroic prism 444, the incident-side polarizing plates 442 by the irradiation of the luminous fluxes by the light source device 411.

First, the radiation routes of respective liquid crystal panels 441R, 441G, 441B will be explained hereunder.

The liquid crystal panel 441 has the emergent-side dustproof plate 441E and the incident-side dustproof plate 441F. The emergent-side dustproof plate 441E and the incident-side dustproof plate 441F are connected to the holding frame 446 in which the liquid crystal panel 441 is housed/held. Therefore, the heat of the liquid crystal panel 441 is radiated to the holding frame 446 via the emergent-side dustproof plate 441E and the incident-side dustproof plate 441F.

The holding frame 446 is connected to the thermal conduction plates 447 fixed to the luminous-flux incident-side surface of the holding frame 446. Thus, the heat transferred to the holding frame 446 is heat exchanged with the cooling air in the panel cooling system A and also is radiated onto the thermal conduction plates 447.

The thermal conduction plates 447 are connected to the wall portions 513B, 514B of the thermal conduction frames 513, 514 attached to the lower light guide 51. The heat being transferred to the thermal conduction plates 447 is heat exchanged with the cooling air in the panel cooling system A and also is radiated onto the thermal conduction frames 513, 514.

At this time, the thermal conduction plates 447 are thermally expanded by the transferred heat. Thus end portions of the thermal conduction plates 447 in the extended direction are moved toward the thermal conduction frames 513, 514. In this case, since the thermal conduction frame 513 is moved forward and backward along the bottom surface portion 512B of the lower light guide 51, deformation of the thermal conduction plates 447 due to the thermal expansion can be absorbed. Therefore, since differences in the thermal expansions of respective thermal conduction plates 447 due to variation of the heat being generated in respective liquid crystal panels 441R, 441G, 441B can be absorbed by the movement of the thermal conduction frame 513, generation of the uneven stress of the thermal conduction plates 447 can be suppressed.

The thermal conduction frames 513, 514 are connected to the bottom surface portion 512B of the lower light guide 51 via the attaching portion 513A, 514A. Thus, the heat transferred to the thermal conduction frames 513, 514 is heat exchanged with the cooling air in the panel cooling system A and also is radiated onto the portion, on which the first passage 6A is formed, of the bottom surface portion 512B of the lower light guide 51. Then, this heat is heat exchanged with the cooling air that is passing through the first passage 6A of the panel cooling system A.

The radiation routes of the emergent-side polarizing plates 443 will now be explained.

In this case, the heat transfer between the holding frame 446, in which the liquid crystal panel 441 is housed, and the emergent-side polarizing plates 443, is shut off by the spacers 449 made of the resins with a heat insulating property. Thus, the heat being fed from the emergent-side polarizing plates 443 side is not transferred to respective liquid crystal panels 441R, 441G, 441B.

The polarizing films 443A of the emergent-side polarizing plates 443 generate the heat because of the transmission of the luminous flux. The polarizing films 443A are connected to the substrates 443B. The heat generated in the polarizing films 443A is heat exchanged with the cooling air in the panel cooling system A and also is radiated onto the substrates 443B.

The substrates 443B are connected to the pedestals 445 being fixed to upper and lower surfaces of the cross dichroic prism 444. The heat being transferred to the substrates 443B is heat exchanged with the cooling air in the panel cooling system A and also is radiated onto the upper and lower pedestals 445.

Here, the heat generated in the cross dichroic prism 444 is also radiated onto the pedestals 445 arranged on the upper and lower surfaces of the cross dichroic prism 444.

The pedestal 445 fixed over the cross dichroic prism 444 comes into contact with the internal air in the casing 5A. Thus, the heat being transferred to the pedestal 445 fixed over the dichroic prism 444 is heat exchanged with the cooling air in the panel cooling system A.

The pedestal 445 fixed under the cross dichroic prism 444 is connected to the bottom surface portion 512B of the lower light guide 51. Thus, the heat being transferred to the pedestal 445 fixed under the dichroic prism 444 is transferred onto the bottom surface portion 512B in the second passage 6B.

As described above, the heat exchange between the bottom surface portion 512B in the second passage 6B and the cooling air in the second passage 6B is seldom executed. Therefore, this heat is transferred to the first passage 6A side and then is heat exchanged with the cooling air in the first passage 6A.

Then, the radiation routes of the incident-side polarizing plates 442 will be explained hereunder.

Like the emergent-side polarizing plates 443, the polarizing films of the incident-side polarizing plates 442 generate the heat because of the transmission of the luminous flux. The heat in the polarizing films is transferred to the substrates of the incident-side polarizing plates 442. Since the substrates are supported by the polarizing-plate holders 512B3 provided to project from the bottom surface portion 512B, the heat transferred to the substrates is transmitted to the bottom surface portion 512B in the first passage 6A via the polarizing-plate holders 512B3. Then, this heat is heat exchanged with the cooling air passing through the first passage 6A in the panel cooling system A.

1-5. Advantages of the First Exemplary Embodiment

Therefore, according to the present exemplary embodiment, the following and/or other advantages can be achieved.

(1-1) Such a configuration is formed that the heat, generated in the liquid crystal panels 441, the emergent-side polarizing plates 443, the cross dichroic prism 444, and the incident-side polarizing plates 442, is transferred to the bottom surface portion 512B of the lower light guide 51 and radiated.

Since the bottom surface portion 512B is cooled directly by the cooling air passing through the first passage 6A, the bottom surface portion 512B can be cooled effectively. As a result, the heat, generated in the liquid crystal panels 441, the emergent-side polarizing plates 443, the cross dichroic prism 444, and the incident-side polarizing plates 442, is readily transferred to the bottom surface portion 512B and thus radiation efficiencies of these parts can be enhanced.

(1-2) Also, in the present exemplary embodiment, the super-high pressure mercury lamp is used as a light source lamp 416. An intensity of light of the red light is weaker than intensities of light of the green light and the blue light in the super-high pressure mercury lamp. Therefore, a calorific value of the liquid crystal panel 441R on which the red light is incident is smaller than those of the liquid crystal panels 441G, 441B on which other lights are incident respectively. As a result, the cooling air obtained even after such air cooled the bottom surface portion 512B of the casing 5A can cool sufficiently the liquid crystal panel 441R.

(1-3) Also, the liquid crystal panels 441G, 441B having a large calorific value are cooled by the cooling air being introduced via the second passage 6B. The cooling air passing through the second passage 6B contacts a part of the bottom surface portion 512B, but its contact area is small. Therefore, the cooling air at a lower temperature is introduced into the holes 515B, 515G while a heat exchange is not sufficiently executed. As a result, the liquid crystal panels 441G, 441B can be cooled effectively.

(1-4) As described above, cooling efficiencies of the bottom surface portion 512B of the optical parts casing 5A and the liquid crystal panel 441 can be enhanced and the number of revolution of the intake fan 31 can be lowered. Thus, the noise generated by the revolution of the intake fan 31 can be reduced.

Since the cooling efficiencies of the bottom surface portion 512B of the optical parts casing 5A and the liquid crystal panel 441 can be enhanced, these parts can be sufficiently cooled even by the intake fan that has low performance.

As a result, reduction of cost can be achieved.

(1-5) Also, in the present exemplary embodiment, one opening port is provided to the duct 6 and one intake fan 31 is connected to this opening port. Therefore, in contrast to the case that a plurality of opening ports are provided to the duct and the intake fan 31 is connected to plural opening ports respectively, the number of parts can be reduced and also reduction of cost can be achieved.

(1-6) The duct 6 is formed in the bottom surface portion 512B of the optical parts casing 5A. Therefore, the number of parts can be reduced in contrast to the case that the duct and the optical parts casing are formed as separate bodies.

2. Second Exemplary Embodiment

Figure 11:
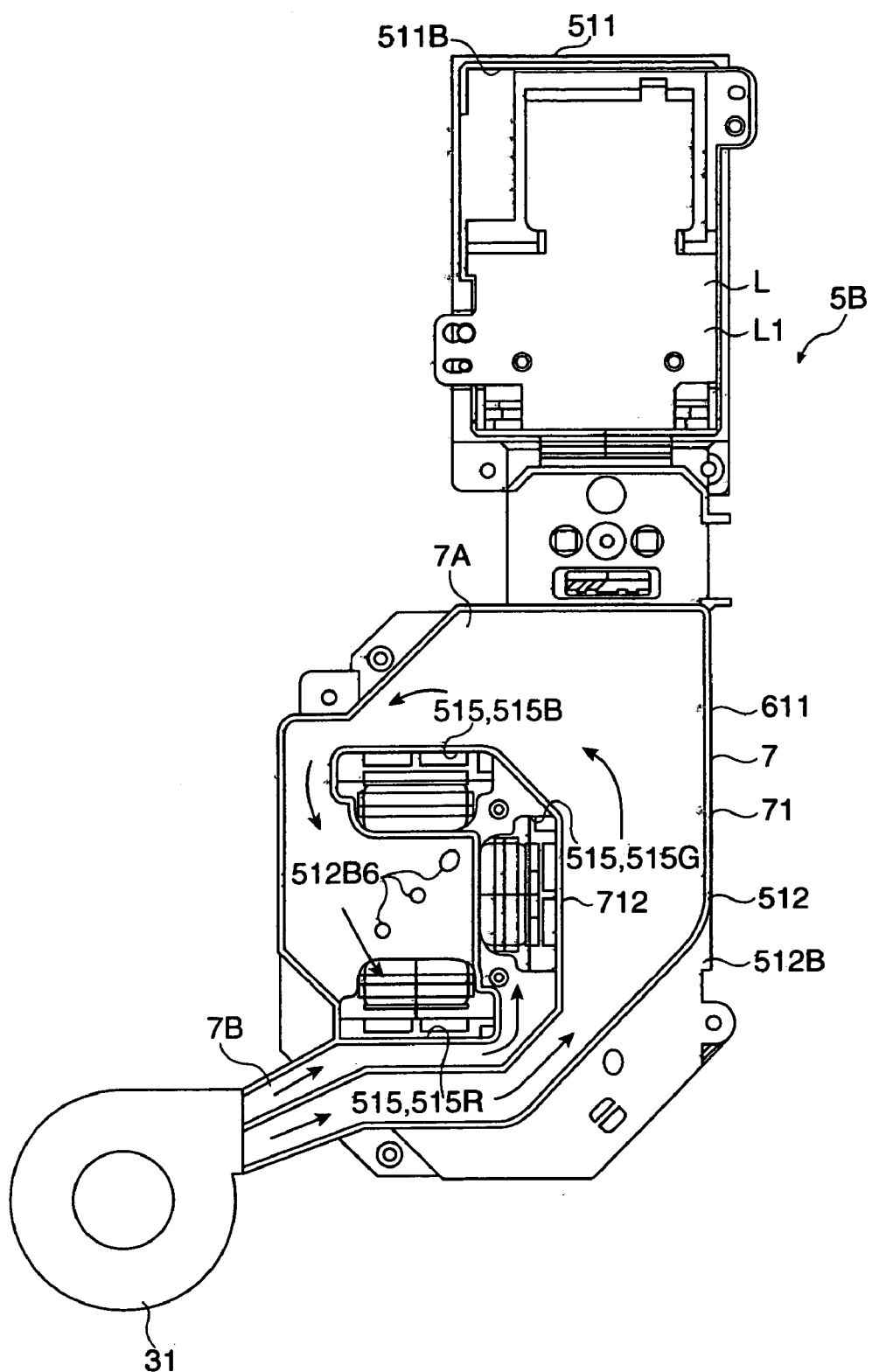
FIG. 11 is a schematic showing an optical parts casing in a second exemplary embodiment of the present invention.

Next, a second exemplary embodiment of the present invention will be explained with reference to FIG. 11 hereunder. In this case, in the following explanations, the same reference symbols are affixed to the same portions as those already explained and their explanations will be omitted herein.

The present exemplary embodiment is different from the above exemplary embodiment in a rib structure of the duct provided to the bottom surface portion 512B of the optical parts casing. An optical parts casing 5B of the present exemplary embodiment has a duct 7 that is different from that in the above exemplary embodiment. But other respects are similar to the optical parts casing 5A in the above exemplary embodiment. The duct 7 in the present exemplary embodiment has a rib (outer peripheral wall) 71. This rib 71 has the first rib 611 almost similar to the above exemplary embodiment, and a second rib (second outer peripheral wall) 712 provided on the inside of the first rib (first outer peripheral wall) 611. In the present exemplary embodiment, the duct 7 and the intake fan 31 act as the cooling system to cool the optical device 44 containing the liquid crystal panel 441.

The second rib 712 surrounds peripheries of the holes 515G, 515B in conformity with the panels 441G, 441B, but does not surround the lower portion of the cross dichroic prism 444 in the optical device 44. One end portion of the second rib 712 is arranged between both end portions of the first rib 611 and is connected to the intake fan 31 whereas the other end portion is connected to the first rib 611 in vicinity of the hole 515R.

In more detail, the second rib 712 extends from one end portion connected to the intake fan 31 to the hole 515G in conformity with the liquid crystal panel 441G that modulates the green light that is the color light having a large intensity of light in respective color lights separated by the color separation optical system 42. Then, the second rib 712 extends from the hole 515G to the hole 515B to surround a periphery of the hole 515B except for one side, and then extends from the hole 515B to the hole 515G and extends from the hole 515G to the other end portion that is connected to the first rib 611 located near the hole 515R. Accordingly, the second rib 712 surrounds a range that is connected in series from the opening port to the hole 515B via the hole 515G.

A portion formed between the second rib 712 and the first rib 611 denotes a first passage 7A, and a portion surrounded by the second rib 712 denotes a second passage 7B.

Next, a flow of the cooling air generated when duct 7 is employed will be explained hereunder.

The cooling air being sucked by the intake fan 31 is supplied to the opening port of the duct 7, and a part of the cooling air is introduced into the first passage 7A. The cooling air being introduced into the first passage 7A flows anti-clockwise in FIG. 11, and circulates through the lower portions of the dichroic mirrors 421, 422 and the lower portion of the cross dichroic prism 444 of the optical device 44 on the bottom surface portion 512B of the lower light guide 51 to cool the bottom surface portion 512B. Then, the cooling air is introduced into the hole 515R formed at the position that corresponds to the liquid crystal panel 441R.

The other part of the cooling air introduced into the opening port of the duct 7 is introduced into the second passage 7B. A part of this cooling air is at first introduced into the hole 515G formed at the position that corresponds to the liquid crystal panel 441G, and the remaining cooling air is introduced into the hole 515B formed at the position that corresponds to the liquid crystal panel 441B. That is, the cooling air flowing through the second passage 7B and like the first exemplary embodiment, the cooling air introduced into the holes 515R, 515G, 515B cools the optical device 44.

According to the present exemplary embodiment, the same advantages as those recited in (1-1), (1-2), (1-4) to (1-6) of the first exemplary embodiment can be achieved, and in addition the following and/or other advantages can be achieved.

(2-1) The second rib 712 does not surround the lower portion of the cross dichroic prism 444 of the optical device 44, and an area of the bottom surface portion 512B surrounded by the second rib 712 is very narrowed. Therefore, a heat exchange between the cooling air passing through the second passage 7B and the bottom surface portion 512B can be reduced or prevented. Thus a temperature rise of the cooling air introduced into the holes 515G, 515B can be reduced or prevented. As a result, the liquid crystal panels 441G, 441B can be cooled effectively and sufficiently.

(2-2) Also, the cooling air passing through the second passage 7B is first introduced into the hole 515G corresponding to the liquid crystal panel 441G. The remaining cooling air is introduced into the hole 515B corresponding to the liquid crystal panel 441B. The liquid crystal panel 441G to modulate the green light has a large calorific value. Thus, even if a quantity of air is small, sufficient air can be introduced into the hole 515G corresponding to the liquid crystal panel 441G. Thus the liquid crystal panel 441G can be cooled.

3. Third Exemplary Embodiment

Figure 12:
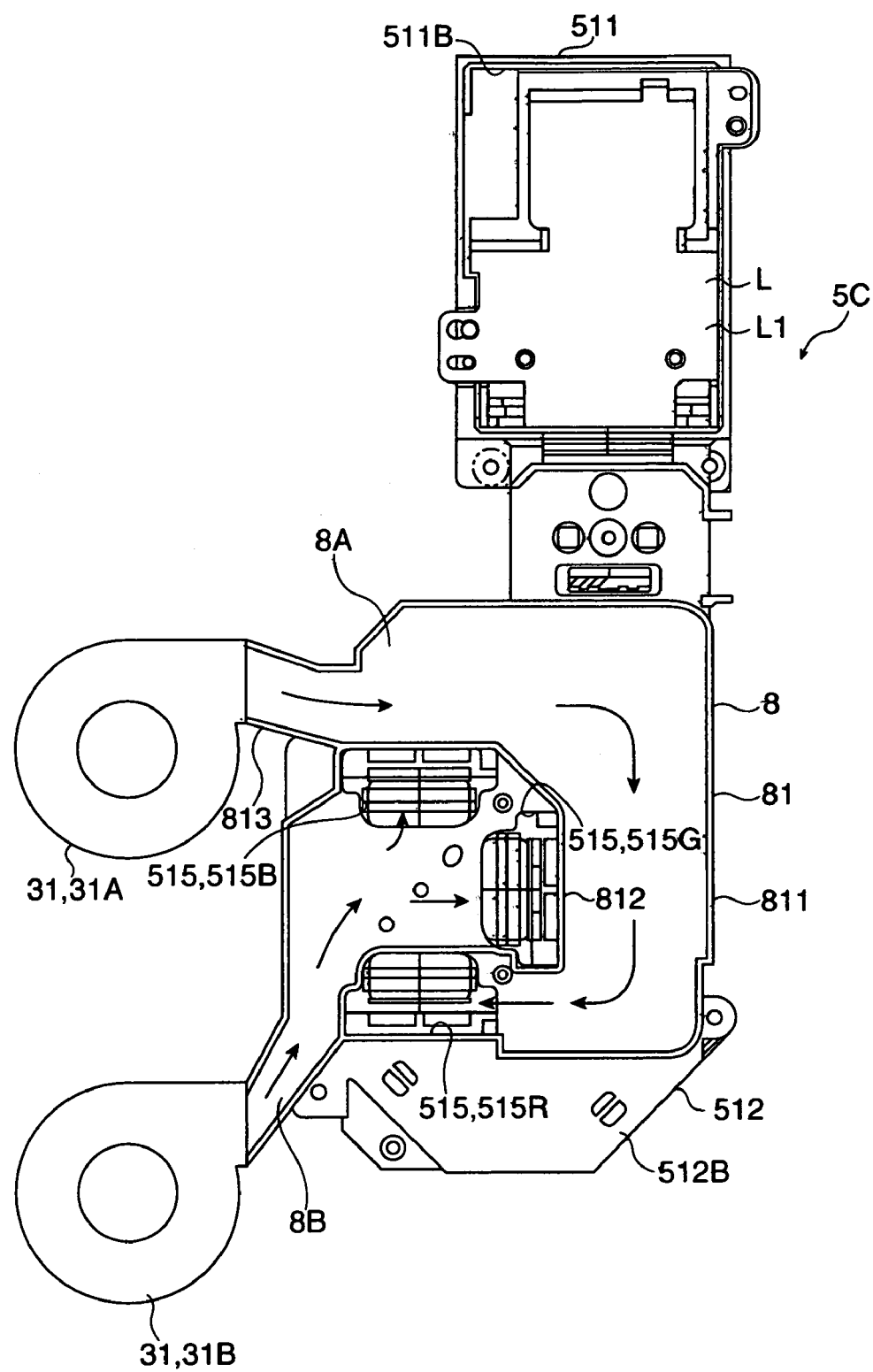
FIG. 12 is a schematic showing an optical parts casing in a third exemplary embodiment of the present invention.

Next, a third exemplary embodiment of the present invention will be explained with reference to FIG. 12.

In the first exemplary embodiment and the second exemplary embodiment, a single intake fan 31 to suck the cooling air is provided. In the present exemplary embodiment, two intake fans are provided.

One intake fan 31A of the intake fan 31 is arranged in front of the hole 515B corresponding to the liquid crystal panel 441B (on the projection lens 46 side (the left side in FIG. 12)), while the other intake fan 31B is arranged in front of the hole 515R corresponding to the liquid crystal panel 441R (on the projection side (the projection lens 46 side)).

An optical parts casing SC in the present exemplary embodiment has a duct 8 whose shape is different from the above exemplary embodiments, but in other respects is similar to those of the optical parts casing 5A in the above exemplary embodiments.

The duct 8 has two opening ports connected to the intake fans 31A, 31B respectively, and a rib (outer peripheral wall) 81. In this case, in the present exemplary embodiment, the intake fans 31A, 31B and the duct 8 act as the cooling system to cool the optical device 44 containing the liquid crystal panel 441.

The rib 81 has a first rib (first outer peripheral wall) 811 that surrounds the lower portion of the optical device 44 and the lower portions of the dichroic mirrors 421, 422, and a second rib (second outer peripheral wall) 812 that surrounds the lower portion of the cross dichroic prism 444 and the lower portions of the liquid crystal panels 441B, 441G out of the optical device 44.

One end of the first rib 811 is connected to the intake fan 314. The other end is connected to the second rib 812 via the outside of the hole 515R.

The second rib 812 integrally surrounds the lower portion of the cross dichroic prism 444 and peripheries of the holes 515B, 515G, but does not surround the periphery of the hole 515R.

Also, both ends of the second rib 812 are connected to the intake fan 31B, and one opening port of the duct 8 is formed by both end portions of the second rib 812. A third rib 813 extending toward the intake fan 31A is provided to a neighboring portion of the hole 515B of the second rib 812. The other opening port of the duct 8 is formed by the third rib 813 and the first rib 811.

In the present exemplary embodiment, a portion formed between the third rib 813 and first rib 811 and a portion formed between the first rib 811 and the second rib 812 denote a first passage 8A. A portion surrounded by the second rib 812 denotes a second passage 8B.

Then, a flow of the cooling air using such duct 8 will be explained hereunder.

The cooling air sucked by the intake fan 31A is supplied to the other opening port and introduced into the first passage 8A. This cooling air flows clockwise in FIG. 12, and circulates through the lower portions of the dichroic mirrors 421, 422 to cool the bottom surface portion 512B. Then, the cooling air is introduced into the hole 515R formed at the position that accord with the liquid crystal panel 441R.

In contrast, the cooling air sucked by the intake fan 31B flows from one opening port to the second passage 8B, and is directly introduced into the holes 515B, 515G formed to correspond to the liquid crystal panels 441G, 441B. At this time, the cooling air flowing in the second passage 8B comes into contact with the lower portion of the cross dichroic prism 444 of the optical device 44 on the bottom surface portion 512B. However, because this contact area is small, a sufficient heat exchange is not executed between the cooling air and the bottom surface portion 512B. Therefore, the cooling of the liquid crystal panels 441G, 441B can be performed by this cooling air.

According to the present exemplary embodiment, the same advantages as those recited in (1-1) to (1-4), (1-6) of the first exemplary embodiment can be achieved, and in addition following advantages can be achieved.

(3-1) Since the intake fans 31A, 31B are provided to the first passage 8A and the second passage 8B respectively, it is feasible to feed enough volume of cooling air into respective passages. Therefore, the bottom surface portion 512B and the liquid crystal panel 441, etc. can be cooled.

4. Fourth Exemplary Embodiment

Figure 13:
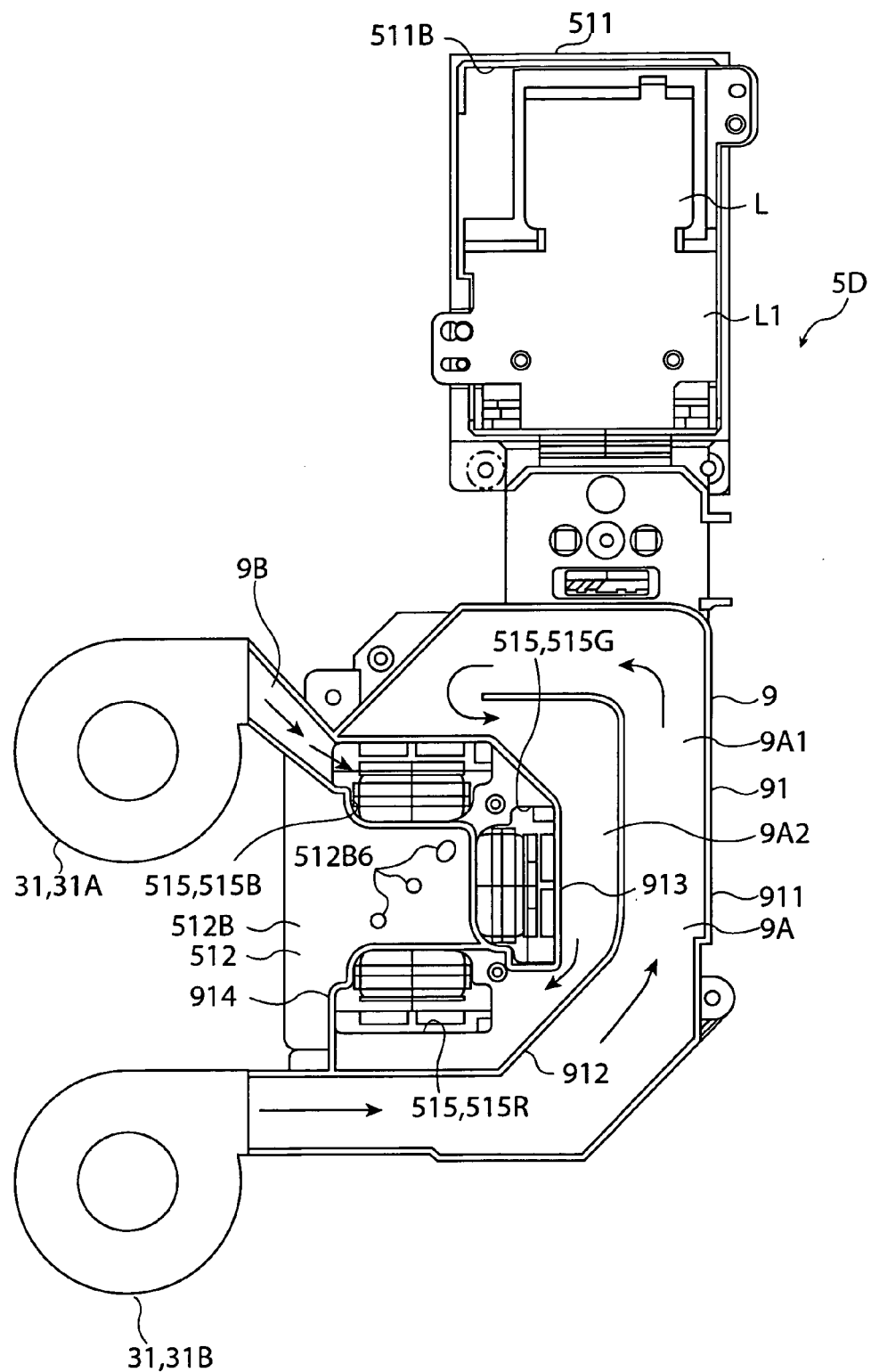
FIG. 13 is a schematic showing an optical parts casing in a fourth exemplary embodiment of the present invention.

Next, a fourth exemplary embodiment of the present invention will be explained with reference to FIG. 13 hereunder.

In the present exemplary embodiment, two intake fans 31A, 31B are provided, like the third exemplary embodiment.

An optical parts casing 5D in the present exemplary embodiment has a duct 9 that is different from the above exemplary embodiments. But in other respects is similar to those of the optical parts casing 5A in the above exemplary embodiments.

A shape of a rib (outer peripheral wall) 91 of the duct 9 in the present exemplary embodiment is different from the shape of the rib 81 of the duct 8 in the third exemplary embodiment. The rib 91 has a first rib (first outer peripheral wall) 911 to surround the lower portion of the optical device 44 and the lower portions of the dichroic mirrors 421, 422, a second rib (second outer peripheral wall) 912 provided on the inner side of the first rib 911 to surround the lower portion of the optical device 44, a third rib (third outer peripheral wall) 913 to surround the holes 515G, 515B, and a fourth rib (fourth outer peripheral wall) 914 extended from the second rib 912 to the third rib 913 to pass through the inner side of the hole 515R.

In this case, in the present exemplary embodiment, the duct 9 and the intake fans 31A, 31B act as a cooling system to cool the optical device 44 containing the liquid crystal panel 441.

One end portion of the first rib 911 is connected to the intake fan 31B, and the other end portion extends near the hole 515B and is connected to the third rib 913.

The second rib 912 extends almost parallel with the first rib 911. One end portion of the second rib 912 is connected to the intake fan 31B, and one opening port of the duct 9 is formed by this end portion and an end portion of the first rib 911. Also, the other end portion of the second rib 912 is arranged between the third rib 913 and the first rib 911 close to the hole 515B.

Both end portions of the third rib 913 are connected to the intake fan 31A, and the other opening port of the duct 9 is formed by both end portions.

In the present exemplary embodiment, a first passage 9A is formed by a portion between the first rib 911 and the second rib 912, a portion between the second rib 912 and the third rib 913, and a portion between the second rib 912 and the fourth rib 914.

Also, a second passage 9B is formed by a portion that is surrounded by the third rib 913.

Then, a flow of the cooling air using duct 9 will be explained hereunder.

The cooling air sucked by the intake fan 31B is supplied to the first passage 9A. This air passes through a portion between the first rib 911 and the second rib 912 of the first passage 9A (outside passage 9A1) to cool the bottom surface portion 512B. Since the first passage 9A comes to a dead end at the connected portion of the first rib 911 and the third rib 913 near the hole 515B, the cooling air is turned back at this portion and is then introduced into a portion between the second rib 912 and the third rib 913 (inside passage 9A2) to cool the bottom surface portion 512B. Then, this air is guided up to the hole 515R and introduced into the hole 515R.

The cooling air introduced into the second passage 9B by the intake fan 31A passes through a portion surrounded by the third rib 913, and a part of the air enters into the hole 515B. The remaining cooling air that did not enter into the hole 515B enters into the hole 515G.

According to the present exemplary embodiment, the same advantages as those recited in (1-1), (1-2), (1-4), (1-6) of the first exemplary embodiment and (3-1) of the third exemplary embodiment can be achieved. In addition following advantages can be achieved.

(4-1) The cooling air in the second passage 9B is introduced into the holes 515B, 515G to scarcely contact the bottom surface portion 512B of the optical parts casing 5D. Therefore, the cooling air can cool the liquid crystal panels 441B, 441G without fail.

(4-2) The first passage 9A in the present exemplary embodiment guides the cooling air from the intake fan 31B provided in front of the hole 515R to the neighboring portion of the hole 515B via the outside passage 9A1, then turns such air back at the connected portion of the first rib 911 and the third rib 913, and then introduces such air into the hole 515R via the inside passage 9A2. In this manner, a time during when the cooling air comes into contact with the bottom surface portion 512B is prolonged since a distance of the first passage 9A is long, so that a heat exchange between the cooling air and the bottom surface portion 512B can be executed sufficiently. Therefore, the bottom surface portion 512B can be cooled. As a result, heat radiation of the optical parts that transfer the heat to the bottom surface portion 512B can be accelerated and also deterioration in quality of the optical parts can be reduced or prevented.

(4-3) Sufficient cooling air can be supplied to the first passage 9A and the second passage 9B in the present exemplary embodiment by the intake fans 31A and 31B respectively. Therefore, even though a distance of the first passage 9A is long, sufficient cooling air can be introduced into the hole 515R. Also, even the remaining cooling air that did not enter into the hole 515B in the second passage 9B can sufficiently cool the hole 515G corresponding to the liquid crystal panel 441G that modulates the green light as the color light having a large intensity of light in respective lights. As a result, the bottom surface portion 512B and the liquid crystal panel 441, etc. can be cooled surely.

5. Fifth Exemplary Embodiment

Figure 14:
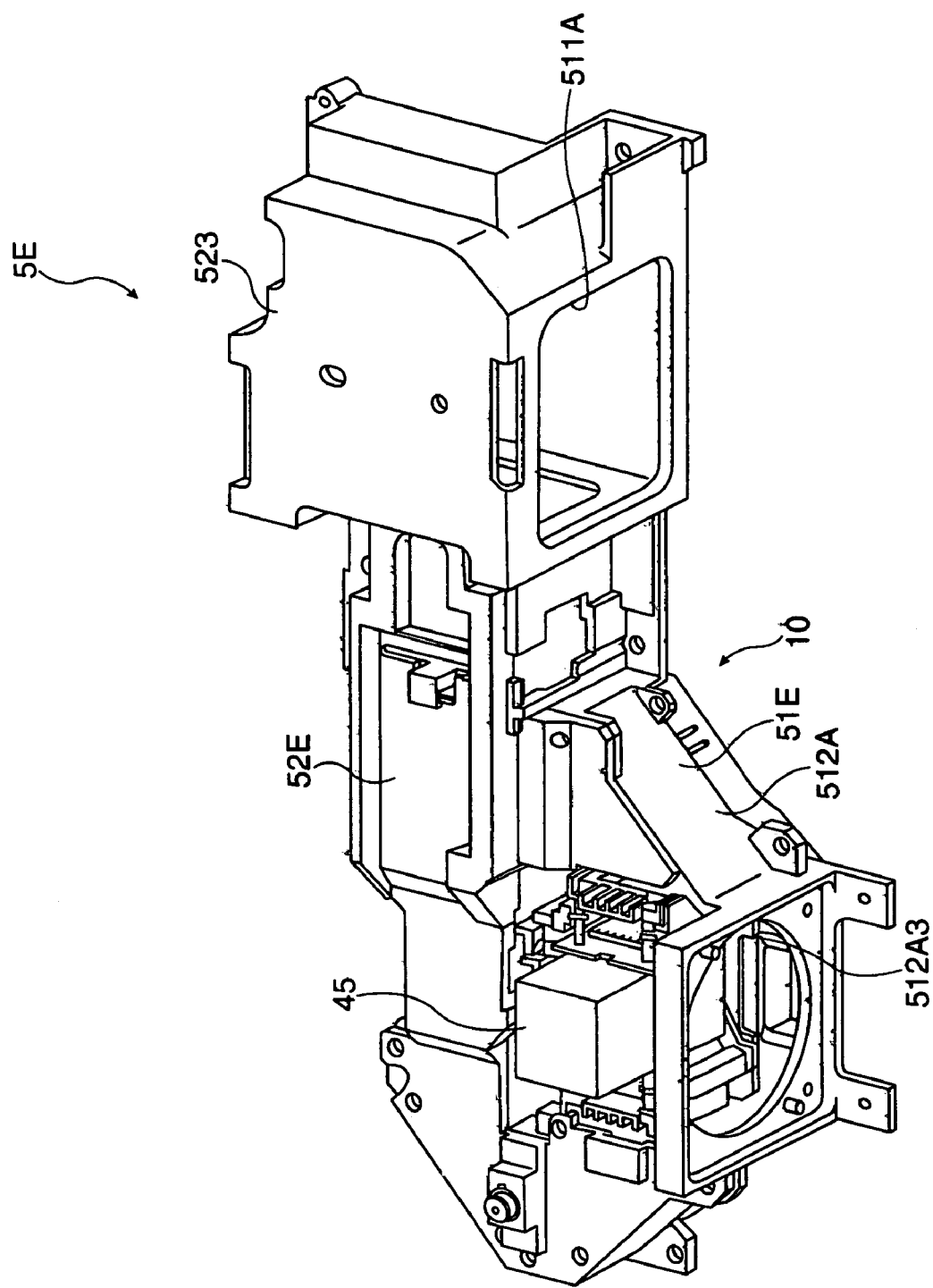
FIG. 14 is a schematic showing an optical parts casing and a duct in a fifth exemplary embodiment of the present invention when viewed from the top side.

Next, a fifth exemplary embodiment of the present invention will be explained with reference to FIG. 14 hereunder.

In the above exemplary embodiments, the ducts 6 to 9 are formed in the optical parts casings 5A to 5D respectively. In the present exemplary embodiment, a duct 10 and an optical parts casing 5E are formed as a separate body respectively.

The optical parts casing 5E has a lower light guide 51E to house respective optical parts 411A, 412 to 415, 418, 421 to 423, 431 to 434, 441 to 444, 46 therein, and an upper light guide 52E provided on the lower light guide 51E.

The lower light guide 51E is different from the above lower light guide S1 in that the light-source housing portion 511 is not provided, and in other respects is similar to the lower light guide 51. This light guide is made of thermal conductive material, e.g., metal, such as aluminum alloy.

The upper light guide 52E is different from the above upper light guide 52, and has a light-source housing portion 523 in which the light source lamp 416, the ellipsoidal mirror 417, and so on are housed. Other respects are similar to the upper light guide 52.

The duct 10 guides the cooling air from the intake fans 31 (31A, 31B) connected to two opening ports respectively (see FIG. 17) to the liquid crystal panels 441R, 441G, 441B in the optical parts casing 5E.

Figure 15:
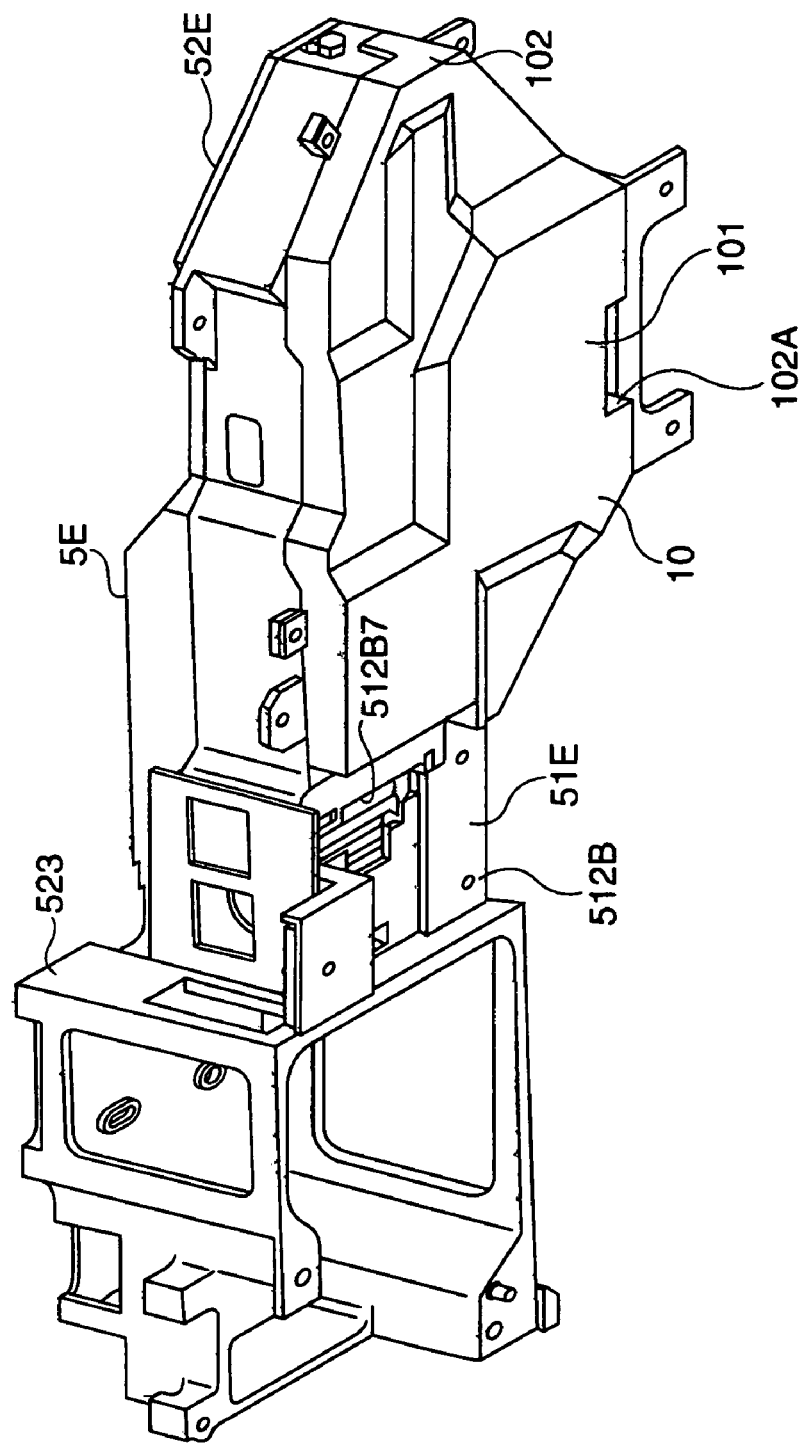
FIG. 15 is a schematic showing the optical parts casing and the duct in the fifth exemplary embodiment of the present invention when viewed from the bottom side.

As also shown in FIG. 15, the duct 10 is attached to a back surface of the bottom surface portion 512B of the lower light guide 51E, and has a box-type shape whose upper surface is opened. This duct 10 is made of thermal conductive material, e.g., metal like the optical parts casing 5E.

Figure 16:
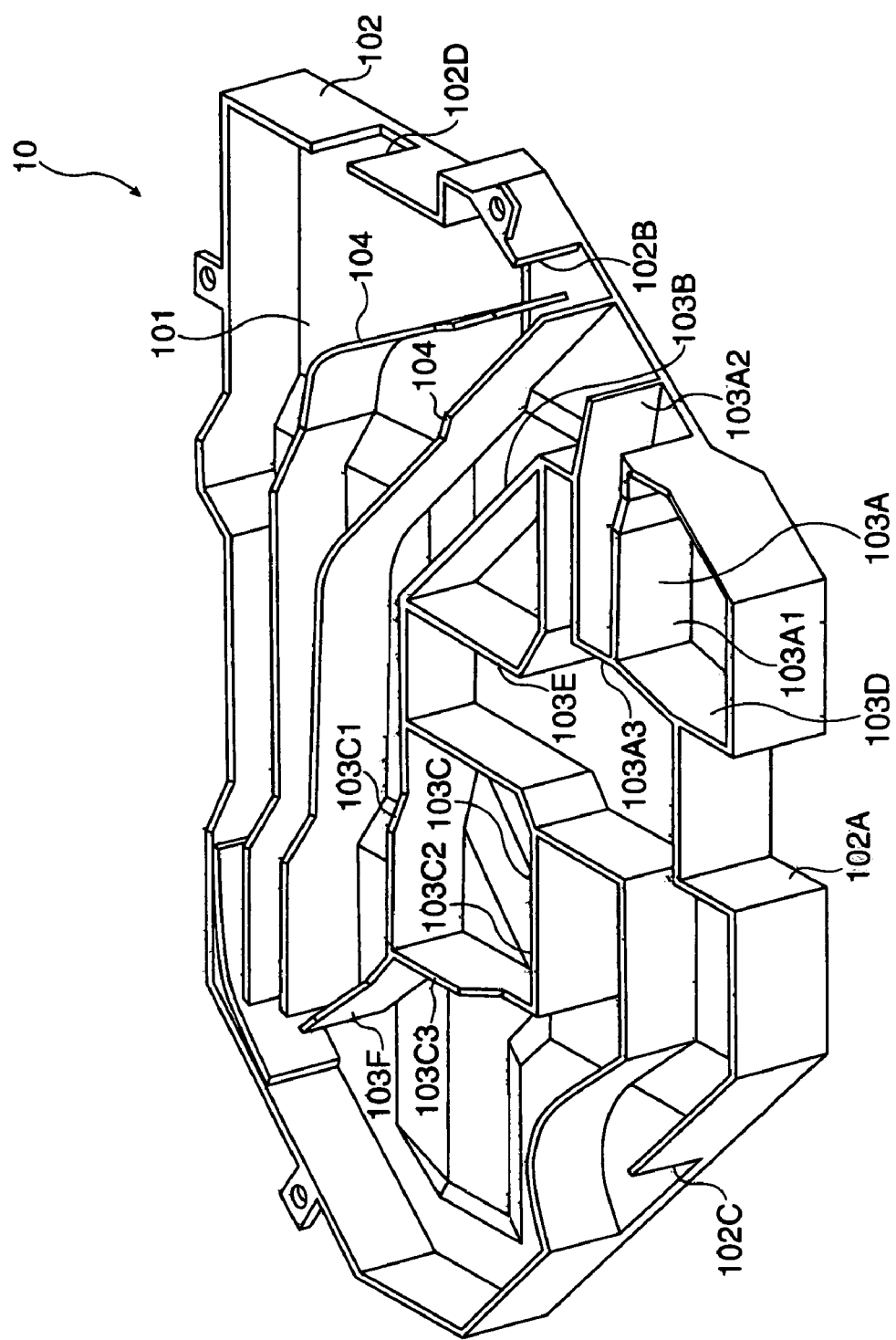
FIG. 16 is a schematic showing the duct in the fifth exemplary embodiment of the present invention.
Figure 17:
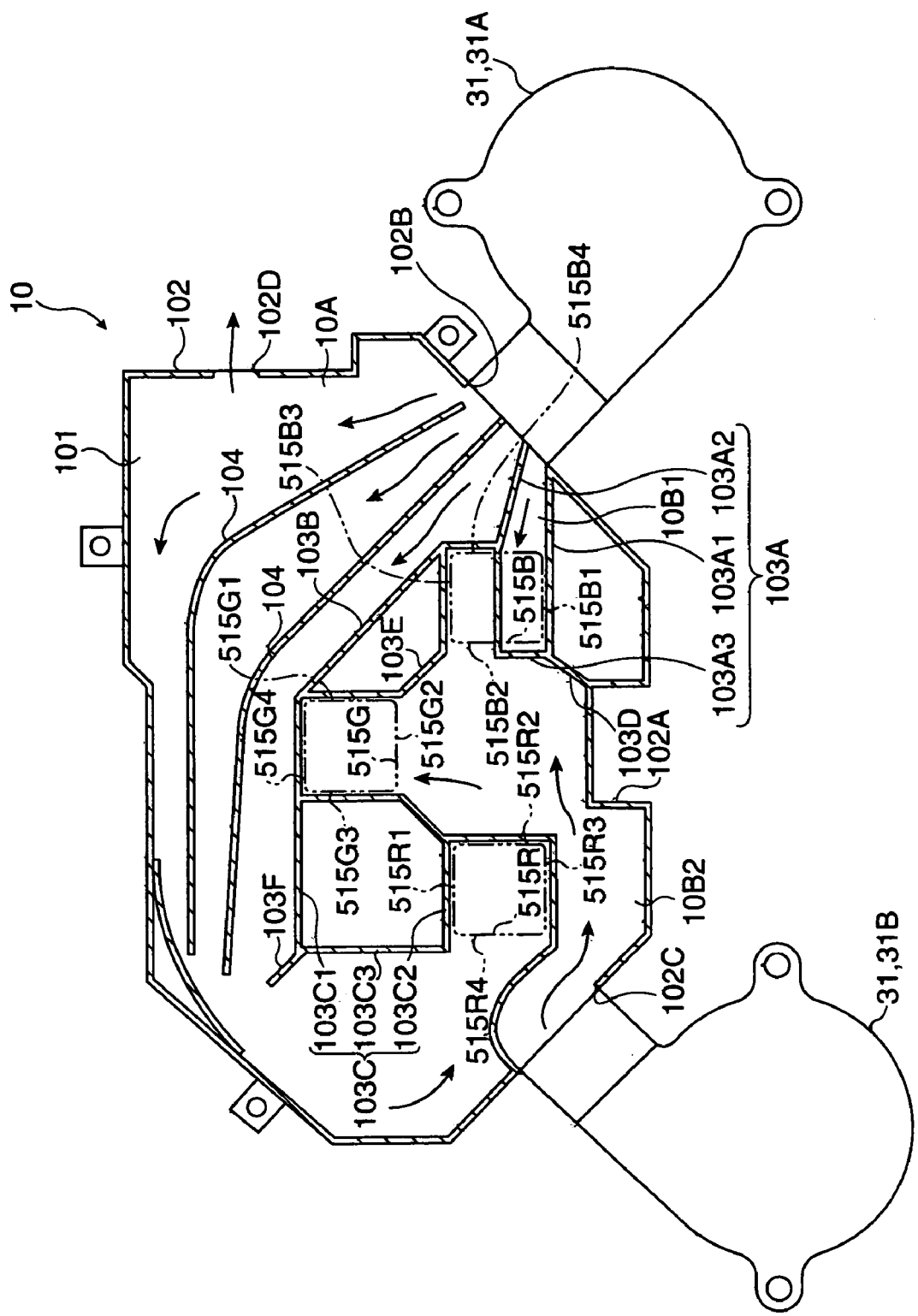
FIG. 17 is a schematic showing the duct in the fifth exemplary embodiment of the present invention.

As shown in FIG. 16 and FIG. 17, the duct 10 has a bottom surface portion 101, and a rib (outer peripheral wall) 102 provided to stand upright from an outer peripheral edge of the bottom surface portion 101. In this case, FIG. 16 and FIG. 17 show the duct 10 viewed from the opening port side on the upper surface.

A concave portion 102A that becomes depressed in the opposite direction to the projection direction is formed to a portion of the rib 102 positioned on the projection side (front side in FIG. 17). Interference between the duct 10 and the projection lens 46 is reduced or prevented by this concave portion 102A.

Also, two notched portions 102B, 102C are formed in side portions of the rib 102. The notched portion 102B serves as a cooling-air introducing opening port that introduces the cooling air into a first passage 10A and a second passage 10B1 described later, while the notched portion 102C serves as a cooling-air introducing opening port that introduces the cooling air into a second passage 10B2. The intake fans 31A, 31B are connected to the opening ports respectively. In this case, the opening port formed by the notched portion 102B is separated into two opening ports, i.e., an opening port to introduce the cooling air into the first passage 10A and an opening port to introduce the cooling air into the second passage 10B1.

A notched portion 102D, different from the notched portions 102B, 102C, is formed in a portion of the rib 102, which is adjacent to the portion in which the integrator illumination optical system 41 of the optical parts casing 5E is housed. A part of the cooling air passing through the first passage 10A flows out from this notched portion 102D, and is introduced into a hole 512B7 formed in the bottom surface portion 512B (see FIG. 15) to cool the polarization-transforming optical element 414, etc. constituting the integrator illumination optical system 41.

Also, plural ribs 103A to 103F are provided to stand upright on the inner side of the rib 102 of the bottom surface portion 101 of the duct 10. Height dimensions of plural ribs 103A to 103F are almost equal to a height dimension of the rib 102. Thus, when the duct 10 is fitted to the bottom surface portion 512B of the optical parts casing 5E, the rib 102 and the ribs 103A to 103F come into contact with the bottom surface portion 512B.

The rib 103A is formed to define the second passage 10B1 that introduces the cooling air into the hole 515B corresponding to the liquid crystal panel 441B of the optical parts casing 5E, and has an almost C-shaped planar shape.

The rib 103A has a pair of pieces 103A1, 103A2 arranged to oppose each other, and a piece 103A3 to connect the pieces 103A1, 103A2. The piece 103A3 is provided to extend along a side 515B2 of the hole 515B when the duct 10 is fitted to the bottom surface portion 512B of the optical parts casing 5E. In this case, in FIG. 17, portions in which the holes 515R, 55G, 515B are positioned are indicated by a dotted line when the duct 10 is fitted to the optical parts casing 5E. Also, in the present exemplary embodiment, the holes 515R, 515G, 515B are formed in an almost square shape. Here, respective sides constituting the hole 515B are assumed as sides 515B1 to 515B4, respective sides constituting the hole 555G are assumed as side 515G1 to 515G4, and respective sides constituting the hole 515R are assumed as side 515R1 to 515R4.

A length dimension of the piece 103A3 is set to be almost half of a length dimension of the side 515B2 of the hole 515B.

The piece 103A1 of the rib 103A extends along the side 515B1 of the hole 515B, and the piece 103A2 extends to cross a center of the hole 515B. Then, the piece 103A2 extends up to an opening port formed by the notched portion 102B. Thus, an opening port to supply the cooling fluid to the second passage 10B1 is formed by top ends of the piece 103A2 and the piece 103A1. Therefore, the cooling air supplied from the opening port, to which the intake fan 31A is fitted, to pass through the second passage 10B1 is introduced from the half portion of the hole 515B on the projection side.

The rib 103B defines the second second passage 10B2, and is connected to the piece 103A2 of the rib 103A and also is extended to surround the outer peripheral sides of the holes 515B, 515G and the inner peripheral side of the hole 515R. Particularly, the rib 103B extends along the side 515B4 of the hole 515B and the outer side 515G4 of the hole 515G and the side 515G3 positioned on the hole 515R side. In addition, the rib 103B extends along the side 515R2 of the hole 515R and the side 515R3 on the rib 102 side, and its top end portion is connected to the notched portion 102C of the rib 102.

The rib 103C is arranged between the holes 515G, 515R when the duct 10 is fitted to the optical parts casing 5E, and has an almost C-shaped planar shape. The rib 103C has two opposing pieces 103C1, 103C2, and a piece 103C3 to connect base portions of these pieces.

Top ends of the pieces 103C1 and 103C2 are connected to the rib 103B. Also, the piece 103C2 comes into contact with the side 515R1 of the hole 515R when the duct 10 is fitted to the bottom surface portion 512B.

Also, the rib 103F extending to the rib 102 side is provided at a corner portion that is constructed by the piece 103C1 and the piece 103C3 of the rib 103C.

The rib 103D extends from an end portion of the piece 103A3 of the rib 103A on the projection side toward the rib 102. This rib 103D is provided to reduce the likelihood or prevent the event that the cooling air introduced from the intake fan 31B flows into a space between the piece 103A1 of the rib 103A and the rib 102 and then stagnates there.

The rib 103E is arranged at a portion between the holes 515B, 515G when the duct 10 is fitted to the bottom surface portion 512B. This rib 103E has an almost C-shaped planar shape, and is arranged to direct its opening port to the rib 103B and connected to the rib 103B. Opposing pieces of the rib 103E extend along the sides 515B3, 515G1 of the holes 515B, 515G respectively. Because this rib 103E is provided, the cooling air passing through the second passage 10B2 never stagnates in the portion between the holes 515B, 515G, so that the cooling air can be introduced into the holes 515B, 515G without fail.

Duct 10 is defined into the first passage 10A and the second passages 10B1, 10B2 by above-mentioned ribs.

Particularly, as described above, the first second passage 10B1 is formed by the rib 103A.

Also, the second second passage 10B2 is formed on a portion, which is positioned on the projection side, of the portion that is surrounded by the rib 103B and the rib 102. That is, the second passage 10B2 is defined by the rib 103B, the rib 102, the rib 103D, the rib 103A, and the rib 103E.

Out of the portion that is surrounded by the ribs 103A to C and the rib 102, a portion positioned on the opposite side to the projection side, a portion positioned between the rib 103F and the rib 102, a portion positioned between the rib 102 and the piece 103C3 of the rib 103C, and a portion positioned between the rib 103B and the piece 103C2 of the rib 103C, act as the first passage 10A that guides the cooling air to cool the liquid crystal panel 441R. Specifically, the first passage 10A is defined by the ribs 103A, B, the rib 102, the rib 103F, and the rib 103C.

Two flow regulating plates 104 are arranged in the first passage 10A. The flow regulating plates 104 have an almost L-shaped planar shape respectively, and are provided to stand upright from the bottom surface portion 101 of the duct 10. Then, two flow regulating plates 104 extend almost parallel with each other from the opening port side connected to the first passage 10A to a top end portion of the rib 103F.

A height dimension of the flow regulating plate 104 is set substantially equal to height dimensions of the ribs 102, 103A to 103F. The flow regulating plates 104 are brought into contact with the bottom surface portion 512B when the duct 10 is fitted to the bottom surface portion 512B of the optical parts casing 5E. The flow regulating plate 104 is formed of thermal conductive material, e.g., metal.

According to the above configuration, as shown in FIG. 17, the duct 10 has the second passage 10B1, the second passage 10B2 near the center of the bottom surface portion 512B, and has the first passage 10A to surround the second passage 10B1 and the second passage 10B2.

A flow of the cooling air using such duct 10 will be explained.

A part of the cooling air sucked by the intake fan 31A is introduced into the first passage 10A. Then the flow of such air is regulated by the flow regulating plates 104. Then such air flows to the top end portion of the rib 103F in the extended direction. Then, such air flows through a space between the top end portion of the rib 103F in the extended direction and the rib 102, and is then turned back. Then, such air passes through a space between the rib 102 and the piece 103C3 of the rib 103C and a space between the piece 103C2 of the rib 103C and the rib 103B, and is then introduced into the hole 515R. A hole that guides the cooling air in the first passage 10A is the hole corresponding to the liquid crystal panel 441 that modulates the color light having a small intensity of light in respective lights. In the present exemplary embodiment, this hole is the hole 515R corresponding to the liquid crystal panel 441R that modulates the red light. Since the magnitude of an intensity of light is explained in the first exemplary embodiment, its explanation will be omitted in the present exemplary embodiment.

In this case, the cooling air cools the bottom surface portion 512B of the optical parts casing 5E while such air passes through the first passage 10A.

Also, out of the cooling air introduced into the first passage 10A, a part of the cooling air flowing in the opposite side to the projection side of the flow regulating plates 104 flows out from the notched portion 102D in the rib 102, and is then introduced into the hole 512B7 formed in the bottom surface portion 512B (see FIG. 15) to cool the polarization-transforming optical element 414, etc. constituting the integrator illumination optical system 41.

The other part of the cooling air sucked by the intake fan 31A is introduced into the second passage 10B1. The cooling air introduced into the second passage 10B1 is introduced into an inside of the optical parts casing 5E via a half of the hole 515B in the optical parts casing 5E on the projection side.

The cooling air sucked by the intake fan 31B flows into the second passage 10B2. This cooling air passes through a space between the rib 102 and the rib 103B, and is then introduced into the holes 515B, 515G.

As described above, the rib 103A has the piece 103A3 extending along the side 515B2 of the hole 515B and the piece 103A2 extending to cross the center of the hole 515B. Therefore, the cooling air from the second passage 10B2 is introduced from a half of the hole 515B on the opposite site to the projection side.

In this case, the cooling air flowing through the second passage 10B2 comes into contact with the lower portion of the cross dichroic prism 444 on the bottom surface portion 512B. However, since the optical parts casing 5A is made of thermal conductive material, e.g., metal, not only portions of the bottom surface portion 512B to which the heat is transferred from the optical device 44 are locally heated at a high temperature, but the heat is dispersed to the overall area of the bottom surface portion 512B. Therefore, the cooling air in the second passage 6B contacts the portion to which the heat of the optical device 44 is transferred. But sufficient heat exchange is not executed between the cooling air and the bottom surface portion 512B because their contact area is small.

Also, the first passage 10A surrounds outsides of the second passages 10B1, 10B2, and the cooling air in the first passage 6A comes into contact with the bottom surface portion 512B to spread over a wide area. Therefore, sufficient heat exchange is executed between the cooling air in the first passage 10A and the bottom surface portion 512B. Thus the heat can be radiated sufficiently from the bottom surface portion 512B.

According to the present exemplary embodiment, almost the same advantages as those recited in (1-1) to (1-4) of the first exemplary embodiment can be achieved, and in addition the following advantages can be achieved.

(5-1) The duct 10 and the optical parts casing 5E are formed as a separate body respectively. Therefore, since the optical parts casing in the present exemplary embodiment can be constructed by simply fitting the duct 10 to the bottom surface portion 512B of the optical parts casing 5E that exists in the related art, there is no need to newly manufacture the optical parts casing. As a result, reduction of cost can be achieved.

(5-2) Since the flow regulating plates 104 are arranged in the first passage 10A, generation of the turbulent flow of the cooling air can be reduced or prevented. Thus, the reduction of noise can be attained. Also, since the generation of the turbulent flow can be reduced or prevented, the cooling air can be supplied effectively and also cooling efficiencies of the liquid crystal panel 441, etc. can be enhanced.

Also, because the flow regulating plates 104 are provided, the cooling air can be passed uniformly in the first passage 10A. Thus, the bottom surface portion 512B of the optical parts casing 5E can be cooled uniformly.

(5-3) Because the flow regulating plates 104 are made of metal and the flow regulating plates 104 come into contact with the bottom surface portion 512B of the optical parts casing 5E, the heat being transferred to the bottom surface portion 512B is transferred to the flow regulating plates 104. Then, because the flow regulating plates 104 are cooled by the cooling air passing through the first passage 10A, such plates can fill the role of a radiating fin. Therefore, the bottom surface portion 512B of the optical parts casing 5E can be cooled effectively. As a result, the heat of the liquid crystal panel 441, the emergent-side polarizing plates 443, the cross dichroic prism 444, and the incident-side polarizing plates 442 is easily transferred to the bottom surface portion 512B to enhance radiation efficiencies of these parts.

(5-4) The cooling air introduced from the intake fan 31B to the second passage 10B2 blows against the concave portion 102A of the rib 102, then rebounds therefrom, and then flows to the holes 515B, 515G side. Thus, it is difficult for the cooling air to enter into a portion, which is located close to the concave portion 102A of the rib 102, of the hole 515B on the projection side. However, in the present exemplary embodiment, since the second passage 10B1 to introduce the cooling air to the portion of the hole 515B on the projection side is provided and the cooling air is introduced via the second passage 10B1, the cooling air can be introduced into the hole 515B. As a result, the liquid crystal panel 441B can be cooled effectively.

(5-5) The intake fan may be connected to the passages 10A, 10B1, 10B2 respectively. In this case, a number of intake fans are needed and a cost of the projector 1 is increased. Also, because a number of intake fans must be installed, a large installing space is required. Thus there is a concern of increase a size of the projector 1. In the present exemplary embodiment, the cooling air is fed to the second passage 10B1 and the first passage 10A by one intake fan 31A. Therefore, an increase in the number of the intake fans can be prevented. Also, since the space onto which the intake fan is installed can be reduced, increase in size of the projector 1 can be prevented.

(5-6)In the present exemplary embodiment, when the duct 10 is fitted to the bottom surface portion 512B of the optical parts casing 5E, three sides (sides 515G1, 515G3, 515G4) of the hole 515G are surrounded by the ribs 103B, 103E of the duct 10. Therefore, the cooling air does not flow to the outside of the hole 515G. Thus the cooling air can be introduced into the hole 515G surely.

Similarly, since three sides (sides 515R1, 515R2, 515R3) of the hole 515R are surrounded by the ribs 103B, 103C of the duct 10, the cooling air can also be introduced into the hole 515R without fail.

(5-7) A part of the cooling air flowing in the first passage 10A flows out from the notched portion 102D of the rib 102, and is then introduced into the hole 512B7 formed in the bottom surface portion 512B to cool the polarization-transforming optical element 414, etc. constituting the integrator illumination optical system 41. Since the liquid crystal panel 441R that is cooled by the cooling air passing through the first passage 10A modulates the red light whose intensity of light is small, a calorific value of the panel is smaller than those of the liquid crystal panels 441G, 441B that modulate other color lights. Therefore, even when a part of the cooling fluid passing through the first passage 10A is employed to cool the integrator illumination optical system 41, the liquid crystal panel 441R can be cooled sufficiently. As a result, there is no necessity to provide the cooling fan or the like to cool the optical parts constituting the integrator illumination optical system 41, etc. Thus reduction in the number of parts can be achieved.

6. Sixth Exemplary Embodiment

Figure 18:
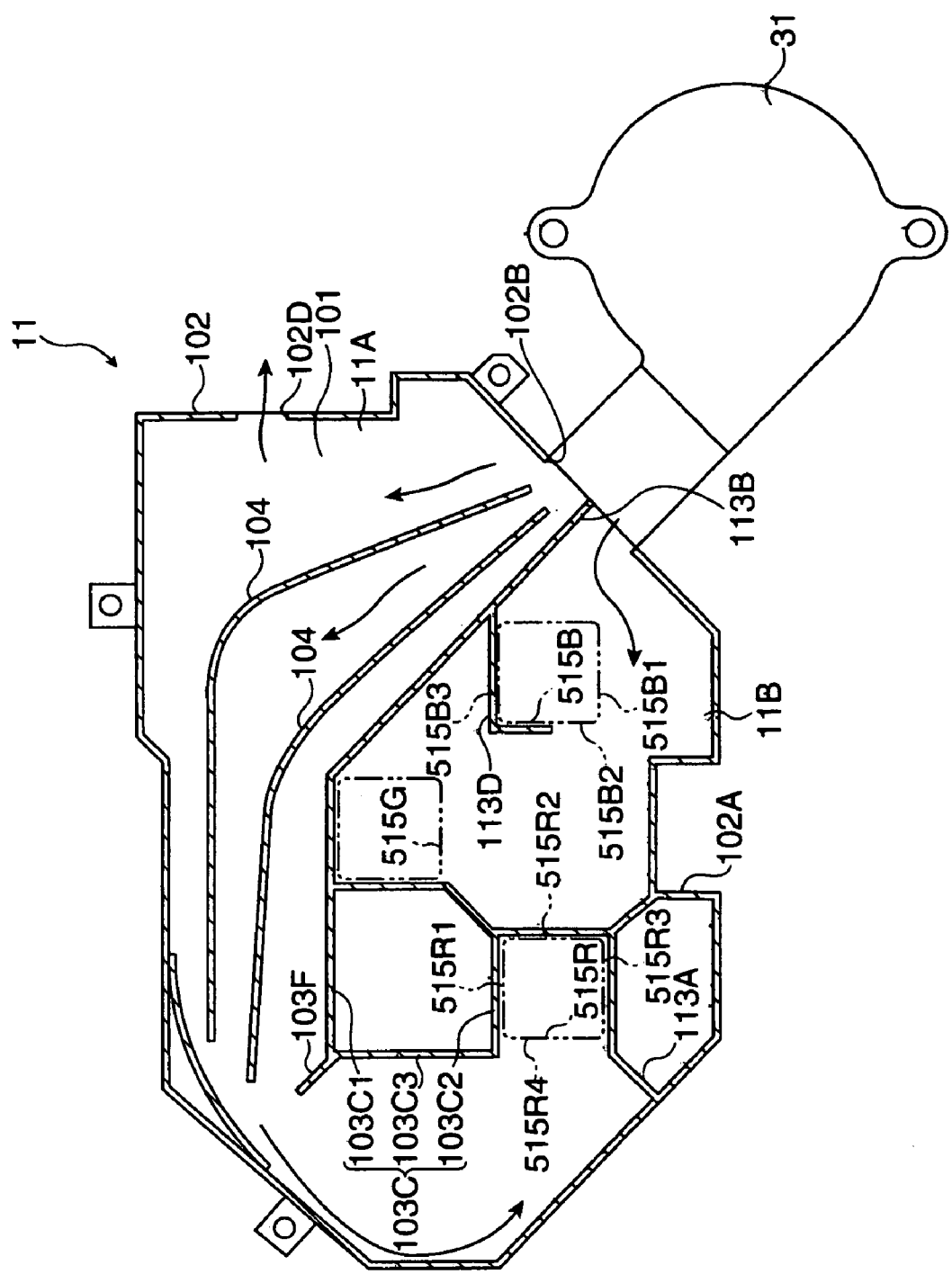
FIG. 18 is a schematic showing a duct in a sixth exemplary embodiment of the present invention.

Next, a sixth exemplary embodiment of the present invention will be explained with reference to FIG. 18 hereunder.

In the fifth exemplary embodiment, two intake fans 31(31A, 31B) are connected to the duct 10. In the present exemplary embodiment, only one intake fan 31 is connected to a duct 11.

Also, in the fifth exemplary embodiment, two second passages 10B1, 10B2 are provided. In the present exemplary embodiment, only one second passage is provided.

Specifically, the duct 11 in the present exemplary embodiment has the bottom surface portion 101, and the rib 102 provided to stand upright from the outer peripheral edge of the bottom surface portion 101. The notched portion 102B and the notched portion 102D are formed in the rib 102. The intake fan 31 is connected to the notched portion 102B, and this notched portion serves as the opening port that introduces the cooling air into a first passage 1A and a second passage 11B described later.

In this case, like the duct 10, this duct 11 is also made of thermal conductive member, e.g., metal or the like.

Ribs 113A, 113B, 113D as well as the ribs 103C, 103F in the above exemplary embodiment are provided upright on the inner side of the rib 102 on the bottom surface portion 101 of the duct 11. Height dimensions of the ribs 113A, 1131B, 113D are set almost equal to the height dimension of the rib 102. The ribs 102, 103C, 103F, 113A, 113B, 113D are brought into contact with the bottom surface portion 512B when the duct 11 is fitted to the bottom surface portion 512B of the optical parts casing 5E.

The rib 113B forms the second passage 11B, and one end is connected to the almost center portion of the notched portion 102B, i.e., the opening port of the rib 102. Also, the rib 113B extends to surround outer periphery sides of the holes 515B, 515G in the bottom surface portion 512B of the optical parts casing 5E and extends along the inner side 515R2 of the hole 515R. The other end of the rib 113B reaches the concave portion 102A of the rib 102.

The same rib 103C as the fifth exemplary embodiment is connected to the rib 113B, and then the rib 103F is connected to the rib 103C.

Also, the rib 113A is formed along the side 515R3 of the hole 515R on the bottom surface portion 101, and one end of the rib 113A is connected to the rib 102 while the other end is connected to the rib 113B.

The rib 113D is connected to the rib 113B. The rib 113D has an almost L-shaped planar shape, and extends along the side 515B2 and the side 515B3 of the hole 515B. A length dimension of the rib 113D of the portion along the side 515B2 is about half the side 515B2.

In the present exemplary embodiment, the first passage 11A is formed by, a portion that is surrounded by the rib 113B and the rib 102 and located on the opposite side to the projection side, a portion positioned between the rib 103F and the rib 102, a portion positioned between the piece 103C3 of the rib 103C and the rib 102, and a portion surrounded by the piece 103C2 of the rib 103C and the rib 113A. Also, the second passage 1B is formed by a portion that is surrounded by the rib 113B and the rib 102 and located on the projection side.

Two flow regulating plates 104 similar to the fifth exemplary embodiment are arranged in the first passage 11A of the duct 11.

A flow of the cooling air using such duct 11 will now be explained.

The cooling air sucked by the intake fan 31 is supplied to the opening port of the duct 11 and a part of the air flows to the first passage 11A. A flow of a part of the cooling air that flows into the first passage 11A is regulated by the flow regulating plates 104. Then such air flows to the top end portion of the rib 103F.

Then, such air flows through a space between the top end portion of the rib 103F in the extended direction and the rib 102, and is then turned back.

Such air passes through a space between the piece 103C3 of the rib 103C and the rib 102 and then a space between the piece 103C2 of the rib 103C and the rib 113A, and is then introduced into the hole 515R. In this case, the cooling air cools the bottom surface portion 512B of the optical parts casing 5E while such air passes through the first passage 11A.

The other part of the cooling air flowing in the first passage 11A flows out from the notched portion 102D to cool the polarization-transforming optical element 414, etc. constituting the integrator illumination optical system 41, like the fifth exemplary embodiment.

The other part of the cooling air supplied to the opening port of the duct 11 is introduced into the second passage 11B. A part of the cooling air introduced into the second passage 11B blows against the rib 113D and is blocked, and is then introduced into the hole 515B. The other part of the air flows through the lower portion of the cross dichroic prism 444, and flows into the hole 515G.

In this case, the cooling air flowing through the second passage 11B comes into contact with the lower portion of the cross dichroic prism 444 on the bottom surface portion 512B. However, since this contact area is small, sufficient heat exchange is not executed between the cooling air and the bottom surface portion 512B.

According to the present exemplary embodiment, the same advantages as those recited in (1-1) to (1-5) of the first exemplary embodiment and (5-1) to (5-3), (5-7) of the fifth exemplary embodiment can be achieved, and in addition following advantages can be achieved.

(6-1) Since the rib 113D extending along the sides 515B2, 515B3 of the hole 515B is provided, the cooling air introduced from the second passage 11B can be blocked and then the cooling air can be introduced into the hole 515B without fail.

In this case, the present invention is not limited to the above exemplary embodiments, and variations, enhancements, etc. made may be contained in the present invention.

For example, in the above exemplary embodiments, the bottom surface portions 512B of the optical parts casings 5A to 5E are cooled by the first passages 6A to 11A of the ducts 6 to 11. But a configuration to cool the side surface portion 512A may be employed when the heat of the optical parts is transferred to the side surface portion 512A.

Also, a configuration to cool not the bottom surface portions 512B of the optical parts casings 5A to 5E but other parts, e.g., optical parts, etc. by the cooling air passing through the first passages 6A to 11A may be employed.

In the first through fourth exemplary embodiments, respective ducts 6 to 9 are completed by bringing the ribs 61 to 91 into contact with the bottom surface portion 221 of the lower case 22 to close mutual top ends of the ribs 61 to 91 in the upright direction. But plate-like members to close mutual top ends of the ribs 61 to 91 may be provided separately.

In this case, like the first through fourth exemplary embodiments, if the ducts 6 to 9 are completed by bringing the top ends of the ribs 61 to 91 into contact with the bottom surface portion 221 of the lower case 22, the members for closing mutual top ends of the ribs 61 to 91 can be neglected. Therefore, reduction in the number of parts can be achieved.

Further, in the above exemplary embodiments, since the super-high pressure mercury lamp is used as the light source lamp 416, the liquid crystal panel 441R that modulates the red light is cooled by the cooling air passing through the first passages 6A to 11A. But the present invention is not limited to such configuration. The optical modulator device that modulates the color light having a small intensity of light in the color lights being emitted from the light source lamp may be cooled by the cooling air passing through the first passage. For example, when the halogen lamp, or the like is used as the light source lamp, the liquid crystal panel 441B that modulates the blue light may be cooled by the cooling air passing through the first passage.

Also, in the first through fourth exemplary embodiment and the sixth exemplary embodiment, the first passages 6A to 9A and 11A are used to cool the liquid crystal panel 441R as the optical modulator device, which modulates the color light having a small intensity of light, out of plural optical modulator devices, whereas the second passages 6B to 9B and 11B are used to cool the liquid crystal panels 441G and 441B as other optical modulator devices. But this application is not limited to this configuration. The optical modulator device that modulates the color light having a small intensity of light in response to the characteristic of the lamp used as the light source lamp 416 may be cooled by the first passages 6A to 9A and 11A, while other optical modulator devices that modulate other color lights may be cooled by the second passages 6B to 9B and 11B.

Also, in the first through fourth exemplary embodiments and the sixth exemplary embodiment, one optical modulator device is cooled by the first passages 6A to 9A and 11A, while two optical modulator devices are cooled by the second passages 6B to 9B and 11B. But this application is not limited to this configuration. Two optical modulator devices that modulate the color light having a small intensity of light in response to the characteristic of the lamp may be cooled by the first passages 6A to 9A and 11A, while one optical modulator device that modulates another color light may be cooled by the second passages 6B to 9B and 11B.

In the above exemplary embodiments, examples of the projector in which three optical modulator devices are employed are explained. But the present invention can be applied to a projector in which two optical modulator devices or four optical modulator devices or more are employed. In this case, the optical modulator device cooled by the first passages 6A to 9A and 11A and the optical modulator device cooled by the second passages 6B to 9B and 11B can be selected in response to the characteristic of the lamp used as the light source lamp 416 and the cooling efficiency respectively.

The liquid crystal panels 441R and 441B are not limited to the configuration in which two liquid crystal panels cooled by the second passages 6B to 9B and 11B are used. For example, such a configuration may be employed that, when the super-high pressure mercury lamp is used, the second passages 6B to 9B and 11B, cool only the liquid crystal panel 441G as the optical modulator device, which modulates the color light having a large intensity of light, of plural optical modulator devices, while the first passages, 6A to 9A and 11A, cool the liquid crystal panels 441R and 441B as other optical modulator devices.

Figure 19:
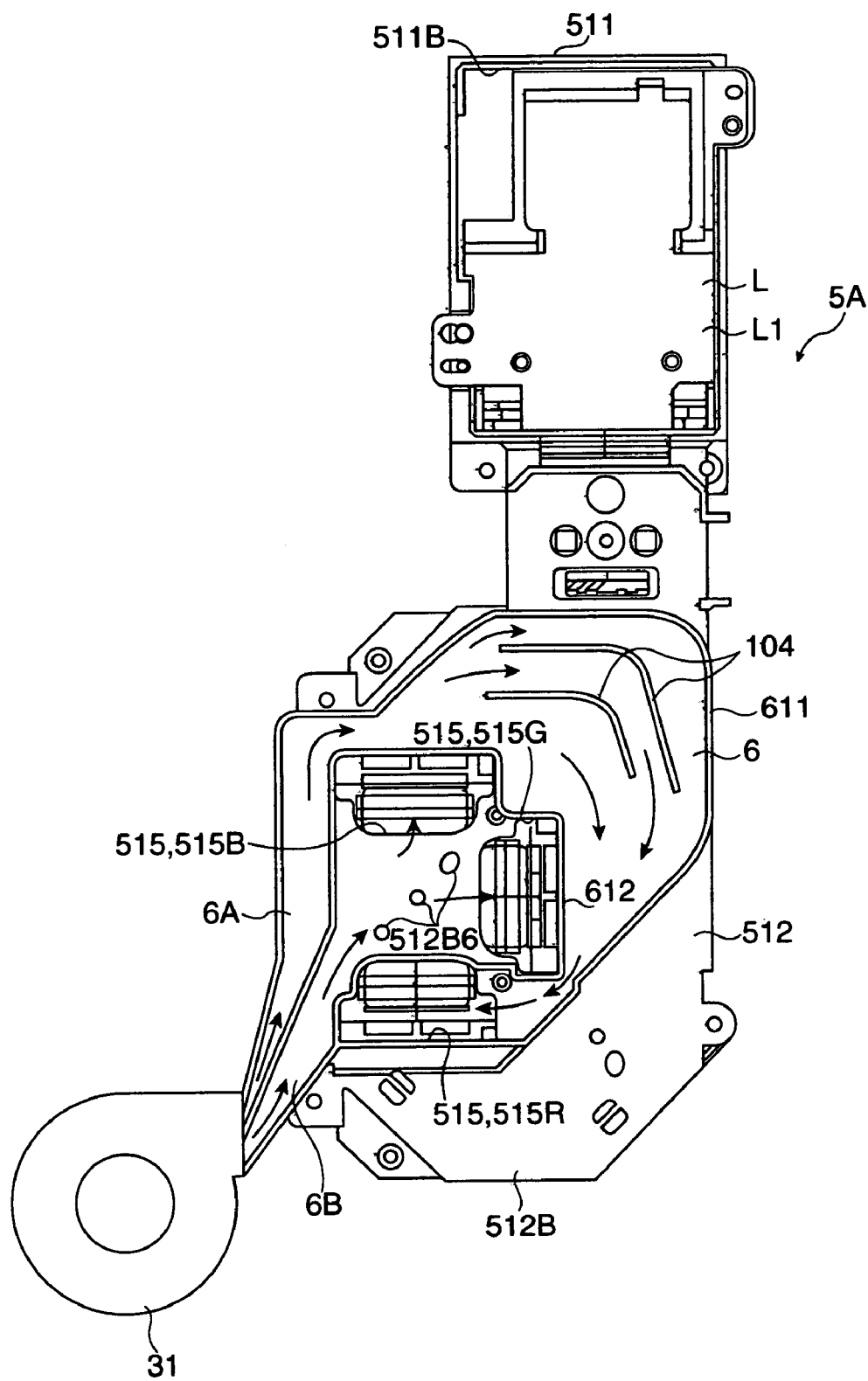
FIG. 19 is a schematic showing an optical parts casing according to a modification of the present invention.

In the first through fourth exemplary embodiments, no flow regulating plate is arranged in the passage. However, as shown in FIG. 19, the flow regulating plates 104 may be arranged. In this case, as shown in FIG. 19, the flow regulating plates 104 may be provided upright on the bottom surface portion 512B of the optical parts casing 5A. Also, the flow regulating plate may be provided upright on the bottom surface portion 221 of the lower case 22 of the outer case and this plate may be arranged in the passage. When doing this, generation of the turbulent flow of the cooling air flowing through the passage can be reduced or prevented and the reduction of noise can be achieved.

Figure 20:
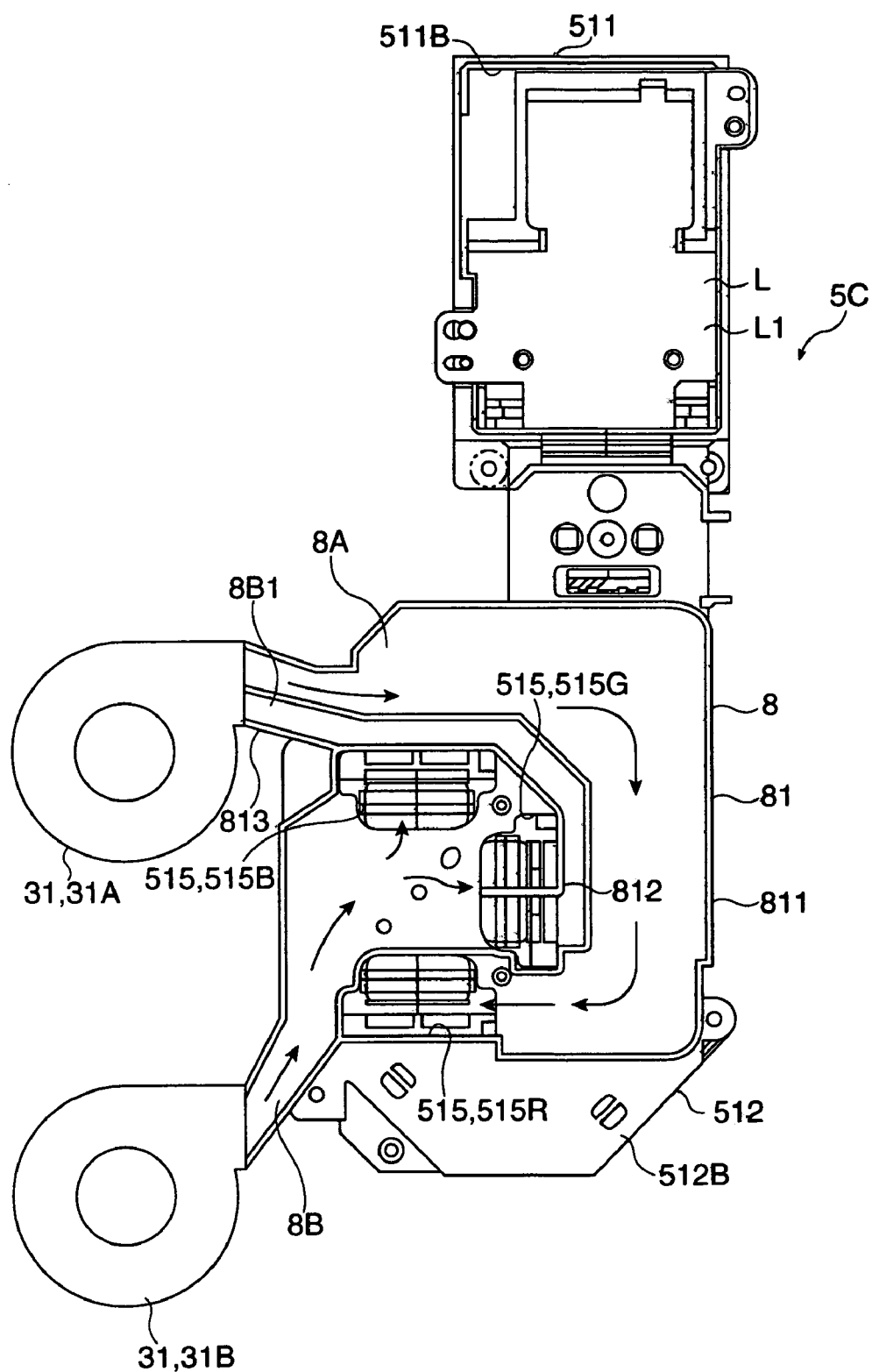
FIG. 20 is a schematic showing an optical parts casing according to another modification of the present invention.

Further, in the first through fourth exemplary embodiments, only one second passage is provided. However, for example, as shown in FIG. 20, a second second passage 8B1 may be formed. In this case, the second second passage 8B1 and the first passage 8A may be connected to the same intake fan 31A. According to this, in addition to the advantages of the first through fourth exemplary embodiments, the same advantages as those recited in (5-4) and (5-5) of the fifth exemplary embodiment can be achieved.

Also, in the fifth and sixth exemplary embodiments, the flow regulating plates 104 are provided, but the flow regulating plate 104 may not be provided. When doing this, the number of parts used in the ducts 10, 11 can be reduced.

Furthermore, in the fifth exemplary embodiment, two second passages 10B1, 10B2 are provided, but the second passage 10B1 may be omitted.

Figure 21:
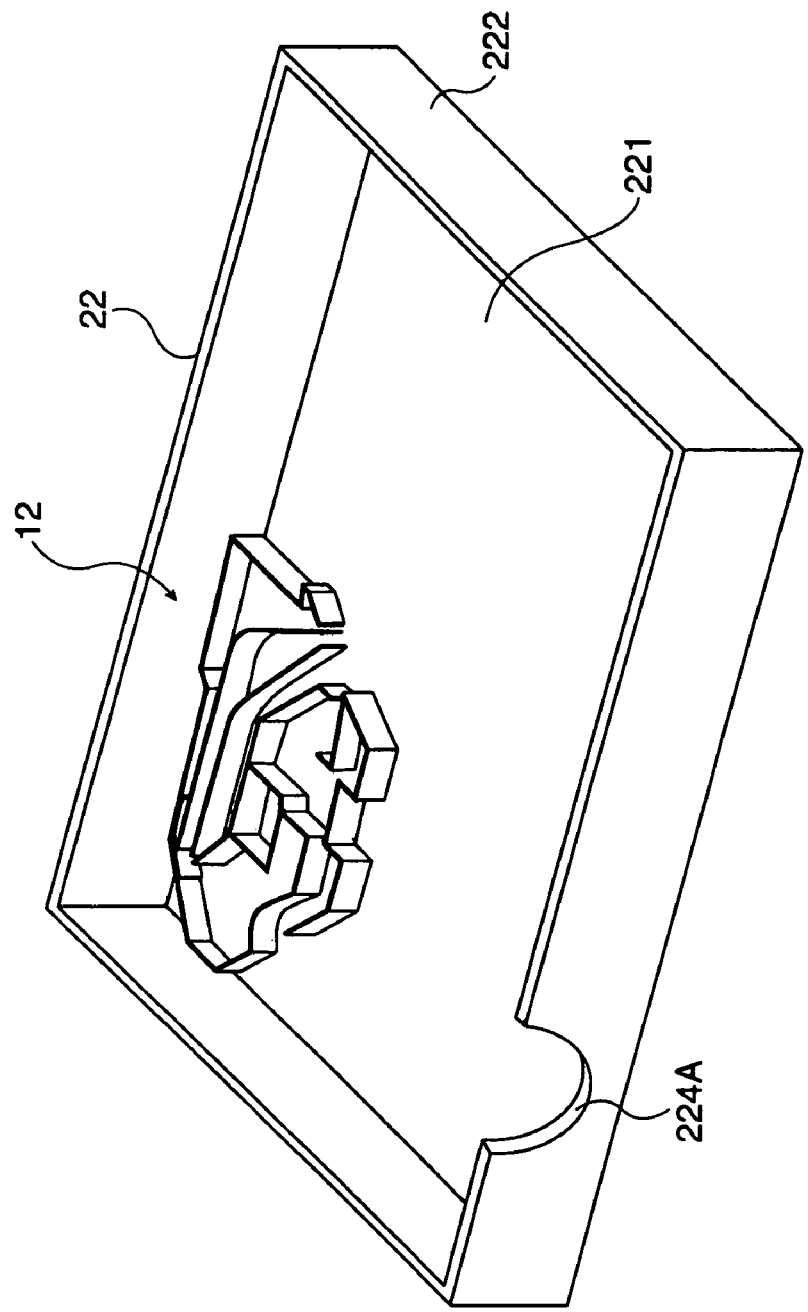
FIG. 21 is a schematic showing an outer case according to still another modification of the present invention.

Also, in the fifth and sixth exemplary embodiments, the optical parts casing 5E and the ducts 10, 11 are constructed as the separate body. As shown in FIG. 21, a duct 12 having almost the same structure as the ducts 10, 11 may be formed in the lower case 22 of the outer case 2. In this case, the ribs constituting the first passage and the second passage are provided upright on the bottom surface portion 221 of the lower case 22 to correspond to the position of the bottom surface portion 512B of the optical parts casing 5E. Then, the duct 12 is constructed by the bottom surface portion 221 of the lower case 22, the ribs, and the bottom surface portion 512B of the optical parts casing 5E. When doing this, in addition to the advantages in the fifth and sixth exemplary embodiments, the following advantages can be achieved. Since the outer case 2 and the duct 12 are formed integrally, the number of parts can be reduced. Also, the optical parts casing employed in the related art can be used.

Moreover, a part of the ribs constituting the duct may be formed on the lower case 22 of the outer case 2, and a part of the remaining ribs may be formed on the bottom surface portion of the optical parts casing.

In the above exemplary embodiments, the first lens array 412 and the second lens array 413 to divide the light from the light source device 411 into a plurality of partial luminous fluxes are used. But the present invention can be applied to the projector that does not use such lens arrays.

In the above exemplary embodiments, examples of the projector that employs the liquid crystal panel as the optical modulator device are explained. But the present invention can be applied to the projector that employs a modulator device except the liquid crystal panel, e.g., the modulator device in which the pixels are constructed by micro mirrors.

In the above exemplary embodiments, examples of the case that the present invention applies to are transmission-type projectors. But the present invention can also be applied to the reflection-type projector. Where the "transmission-type" refers to a type where the light valve, such as the liquid crystal light valve, transmits the light, and the "reflection-type" refers to a type that the light valve reflects the light. In the case of the reflection-type projector, the light valve can be constructed only by the liquid crystal panel and a pair of polarizing plates are not needed. Also, in the reflection-type projector, the cross dichroic prism is utilized as the color light separating device that separates the illumination light into three color lights of red, green, blue. In some cases the cross dichroic prism is used as the color light synthesizing device that synthesizes three modulated color lights once again to emit in the same direction. Also, in some cases the dichroic prism, constructed by combining a plurality of triangular and quadrangular dichroic prisms, may be used in place of the cross dichroic prism. In case the present invention is applied to a reflection-type projector, advantages almost similar to those of the transmission-type projector can be derived.

As the projectors, there are the front projector to project the image from the direction along which a project surface is viewed and the rear projector to project the image from the opposite side to the direction along which the projected surface is viewed. The configuration in the above exemplary embodiments can be applied to both the front projector and the rear projector.

The invention claimed is:
1. An optical parts casing for housing optical parts including a plurality of optical modulator devices that modulate a plurality of color lights in response to image information for every color light, the optical parts housed inside the casing and arranged at predetermined positions on an illumination optical-axis of a luminous flux emitted from a light source comprising:
   a thermal-conductive outer surface portion that the optical parts contact; and
   ribs provided upright on the outer surface portion to constitute ducts that guide a cooling fluid to cool the plurality of optical modulator devices, and holes formed in the outer surface portion to guide the cooling fluid from the ducts to the optical modulator devices in the optical parts casing;
   the ribs including a rib to define a first passage that guides cooling fluid introduced from cooling-fluid introducing opening ports of the ducts to one optical modulator device that modulates a color light having a smaller intensity of light of the plurality of color lights, and a rib to define a second passage that guides the cooling fluid introduced from the opening ports to other optical modulator devices and surrounds at least a peripheral portion of each of the other optical modulator devices,
   the rib defining the first passage and the rib defining the second passage being formed such that the first passage completely surrounds the peripheral portions of the second passage along the outer surface portion of the optical parts casing, and
   the cooling fluid passing through the first passage cools the outer surface portion.
2. The optical parts casing according to claim 1, the other optical modulator devices having a plurality of modulator devices,
   the rib defining the second passage defining the second passage connecting in series, respective holes, to guide the cooling fluid to the plurality of other modulator devices, and holes connected directly to the opening ports being holes to guide the cooling fluid to the optical modulator device, which modulates a color light having a larger intensity of light of the plurality of color lights, of the plurality of other optical modulator devices.

3. The optical parts casing according to claim 1, the first passage being formed to have an outer passage to guide the cooling fluid along an outer periphery of the outer surface portion of the optical parts casing, and an inner passage to guide the cooling fluid to a space between the outer passage and the second passage.

4. The optical parts casing according to claim 1, further comprising:
a fan to supply the cooling fluid to the ducts.

5. The optical parts casing according to claim 4, the fan including a first fan fitted to the rib that constitutes the first passage and a second fan fitted to the rib that defines the second passage.

6. The optical parts casing according to claim 1, further comprising:
a fan to supply the cooling fluid to the ducts; and
the rib to define the second passage being formed such that a plurality of second passages are connected to the holes formed on the outer surface portion to guide the cooling fluid to the other optical modulator devices, and
the cooling-fluid introducing opening ports provided in the first passage and cooling-fluid introducing opening ports provided in at least one of the plurality of second passages being connected to a same fan.

7. The optical parts casing according to claim 1, a flow regulating plate to regulate a flow of the cooling fluid being arranged in at least one passage of the ducts.

8. An optical parts casing for housing optical parts including a plurality of optical modulator devices that modulate a plurality of color lights in response to image information for every color light, the optical parts housed inside the casing and arranged at predetermined positions on an illumination optical-axis of a luminous flux emitted from a light source, comprising:
a thermal-conductive outer surface portion that the optical parts in the optical parts casing contact and in which holes to guide a cooling fluid to the optical modulator devices are formed; and
ducts fitted to the outer surface portion, to guide the cooling fluid to cool the optical modulator devices;
the ducts having cooling-fluid introducing opening ports, a rib to define a first passage that guides cooling fluid introduced from the opening ports to one optical modulator device that modulates a color light having a smaller intensity of light of the plurality of color lights, and a rib to define a second passage that guides the cooling fluid introduced from the opening ports to other optical modulator devices and surrounds at least a peripheral portion of each of the other optical modulator devices,
the rib to define the first passage being formed to completely surround the peripheral portions of the second passage along the outer surface portion of the optical parts casing, and
the cooling fluid passing through the first passage cooling the outer surface portion of the optical parts casing.

9. The optical parts casing according to claim 8, further comprising:
a fan to supply the cooling fluid to the ducts.

10. The optical parts casing according to claim 9, the rib to define the second passage being formed such that a plurality of second passages are connected to the holes to guide the cooling fluid to the other optical modulator devices formed on the outer surface portion, and
the cooling-fluid introducing opening ports provided in the first passage and cooling-fluid introducing opening ports provided in at least one of the plurality of second passages being connected to a same fan.

11. The optical parts casing according to claim 8, the ribs having a rib, which blocks a part of the cooling fluid, on a part of outer peripheral portions of the holes that guide the cooling fluid to the optical modulator devices.

12. The optical parts casing according to claim 8, the optical parts having optical parts including an illumination optical system to illuminate substantially uniformly, image forming areas of the optical modulator devices, and
a part of the cooling fluid passing through the first passage cooling the optical parts constituting the illumination optical system.

13. The optical parts casing according to claim 8, a flow regulating plate to regulate a flow of the cooling fluid being provided in at least one passage in the ducts.

14. A projector, comprising:
an illumination optical system;
optical parts containing a plurality of optical modulator devices that modulate a plurality of color lights in response to image information for every color light;
a projection optical system to enlarge and project a light emitted from the optical parts;
an optical parts casing to house the optical parts to arrange the optical parts at predetermined positions on an illumination optical-axis of a luminous flux emitted from the illumination optical system;
an outer casing to house the illumination optical system and the optical parts casing;
ducts to guide a cooling fluid to cool the plurality of optical modulator devices; and
fans to supply the cooling fluid to the duct;
the optical parts casing having a thermal-conductive outer surface portion that the optical parts contact,
the ducts have opening ports to introduce the cooling fluid from the fans, a first passage that guides the cooling fluid from the opening ports to a first optical modulator device that modulates a color light having a small intensity of light in the plurality of color lights, and a second passage that guides the cooling fluid from the opening ports to other optical modulator devices and surrounds at least a peripheral portion of each of the other optical modulator devices,
the first passage being formed to completely surround the peripheral portions of the second passage along the outer surface portion of the optical parts casing, and
the cooling fluid passing through the first passage cooling the outer surface portion.

15. The projector according to claim 14, the optical parts casing having ribs provided upright on the outer surface portion to constitute the ducts, and holes formed in the outer surface portion to guide the cooling fluid from the ducts to the optical modulator devices in the optical parts casing, and
the ribs having a rib to define the first passage and a rib to define the second passage.

16. The projector according to claim 14, further comprising:
holes formed in the outer surface portion of the optical parts casing to guide the cooling fluid to the optical modulator devices, and ducts fitted to the outer surface portion to guide the cooling fluid to cool the optical modulator devices; and the ducts having a rib to define the first passage, and a rib to define the second passage.

17. The projector according to claim 14, ribs constituting the ducts, which guide the cooling fluid to cool the optical modulator devices, being formed on the outer casing at positions that correspond to the outer surface portion of the optical parts casing, and the ribs having a rib to define the first passage and a rib to define the second passage.

18. The projector according to claim 14, the other optical modulator devices having a plurality of modulator devices, the second passage connects in series, respective holes to guide the cooling fluid to the plurality of other modulator devices, and the holes connected directly to the opening port being holes to guide the cooling fluid to the optical modulator device, which modulates a color light having a larger intensity of light of the plurality of color lights, of the plurality of other modulator devices.

19. The projector according to claim 14, the first passage being formed to have an outer passage to guide the cooling fluid along an outer periphery of the outer surface portion of the optical parts casing, and an inner passage to guide the cooling fluid to a space between the outer passage and the second passage.

20. The projector according to claim 14, the fan including a first fan fitted to the first passage and a second fan fitted to the second passage.

21. The projector according to claim 14, the second passage being formed such that a plurality of second passages are connected to the holes to guide the cooling fluid to the other optical modulator devices formed on the outer surface portion, and the cooling-fluid introducing opening ports provided in the first passage and cooling-fluid introducing opening ports provided in at least one of the plurality of second passages being connected to a same fan.

22. The projector according to claim 14, a rib to block a part of the cooling fluid to guide to the holes being provided on a part of outer peripheral portions of the holes in at least one passage of the ducts.

23. The projector according to claim 14, a flow regulating plate to regulate a flow of the cooling fluid being provided in at least one passage in the ducts.

24. The projector according to claim 14, the optical parts having optical parts including an illumination optical system to illuminate substantially uniformly image forming areas of the optical modulator devices, and a part of the cooling fluid passing through the first passage cools the optical parts constituting the illumination optical system.

* * * * *